US011978110B2

(12) United States Patent
Luo et al.

(10) Patent No.: US 11,978,110 B2
(45) Date of Patent: May 7, 2024

(54) GENERATING AUGMENTED REALITY CONTENT BASED ON USER-SELECTED PRODUCT DATA

(71) Applicant: Snap Inc., Santa Monica, CA (US)

(72) Inventors: Jean Luo, Seattle, WA (US); Celia Nicole Mourkogiannis, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 185 days.

(21) Appl. No.: 17/362,796

(22) Filed: Jun. 29, 2021

(65) Prior Publication Data

US 2021/0409614 A1 Dec. 30, 2021

Related U.S. Application Data

(60) Provisional application No. 62/705,472, filed on Jun. 29, 2020.

(51) Int. Cl.

| | |
|---|---|
| ***G06Q 30/00*** | (2023.01) |
| ***G06F 3/01*** | (2006.01) |
| ***G06F 18/2431*** | (2023.01) |
| ***G06Q 30/0601*** | (2023.01) |
| ***G06T 11/00*** | (2006.01) |

(Continued)

(52) U.S. Cl.

CPC ......... *G06Q 30/0643* (2013.01); *G06F 3/011* (2013.01); *G06F 18/2431* (2023.01); *G06Q 30/0631* (2013.01); *G06T 11/00* (2013.01); *G06T 19/006* (2013.01); *G06V 10/751* (2022.01); *G06V 10/764* (2022.01); *G06V 20/20* (2022.01); *G06V 40/165* (2022.01);

(Continued)

(58) Field of Classification Search

CPC ................................................ G06Q 30/06–08

See application file for complete search history.

(56) References Cited

U.S. PATENT DOCUMENTS

| | | | |
|---|---|---|---|
| 2018/0075523 | A1 | 3/2018 | Sartori Odizzio et al. |
| 2019/0012717 | A1 | 1/2019 | Han et al. |

(Continued)

FOREIGN PATENT DOCUMENTS

| | | | |
|---|---|---|---|
| CN | 115735231 | A | 3/2023 |
| KR | 20090044702 | A | 5/2009 |
| WO | 2022006170 | | 1/2022 |

OTHER PUBLICATIONS

"International Application Serial No. PCT/US2021/039706, International Search Report dated Oct. 21, 2021", 4 pgs.

(Continued)

*Primary Examiner* — Ethan D Civan

(74) *Attorney, Agent, or Firm* — Schwegman Lundberg & Woessner, P.A.

(57) ABSTRACT

In one or more implementations, information about a number of products may be obtained. Visual effects corresponding to each product may be applied to objects included in user content to change the appearance of the objects included in the user content. Augmented reality content may be implemented to cause changes to the appearance of one or more objects included in the user content. In various examples, a number of visual effects related to different products may be applied to objects included in the user content. A user interface including information about each of the products applied to objects included in the user content may be produced.

20 Claims, 14 Drawing Sheets

(51) Int. Cl.

| | |
|---|---|
| ***G06T 19/00*** | (2011.01) |
| ***G06V 10/75*** | (2022.01) |
| ***G06V 10/764*** | (2022.01) |
| ***G06V 20/20*** | (2022.01) |
| ***G06V 40/16*** | (2022.01) |
| ***H04N 5/262*** | (2006.01) |
| *H04N 5/272* | (2006.01) |

(52) U.S. Cl.

CPC ......... *G06V 40/171* (2022.01); *H04N 5/2621* (2013.01); *H04N 2005/2726* (2013.01)

(56) References Cited

U.S. PATENT DOCUMENTS

2019/0026013 A1 1/2019 Aarabi
2019/0244272 A1* 8/2019 Lee ........................ G06Q 30/02
2019/0266660 A1* 8/2019 Wang .................... G06F 3/0482

OTHER PUBLICATIONS

"International Application Serial No. PCT/US2021/039706, Written Opinion dated Oct. 21, 2021", 5 pgs.
Merothiya, Shashank, "Shaping the future of Beauty Brands with Augmented Reality", [Online] Retrieved from the Internet: <URL: https://www.srijan.net/resources/blog/shaping-future-beauty-brands-augmented-reality>, (Jun. 19, 2019), 4 pgs.
Williams, Robert, "Perfect brings AR tools for beauty brands to WeChat", [Online] Retrieved from the Internet: <URL: https://www.marketingdive.com/news/perfect-brings-ar-tools-for-beauty-brands-to-wechat/577730/>, (May 12, 2020), 3 pgs.
"European Application Serial No. 21833731.9, Response filed Aug. 7, 2023 to Communication pursuant to Rules 161(2) and 162 EPC dated Feb. 7, 2023", 17 pgs.
"International Application Serial No. PCT/US2021/039706, International Preliminary Report on Patentability dated Jan. 12, 2023", 7 pgs.
"European Application Serial No. 21833731.9, Extended European Search Report dated Jan. 19, 2024", 7 pgs.
"Korean Application Serial No. 10-2023-7003261, Notice of Preliminary Rejection mailed Feb. 23, 2024", w/ English Translation, 10 pgs.

* cited by examiner

GENERATING AUGMENTED REALITY CONTENT BASED ON USER-SELECTED PRODUCT DATA

CROSS-REFERENCE TO RELATED APPLICATION

This patent application claims the benefit of U.S. Provisional Patent Application No. 62/705,472, filed Jun. 29, 2020, entitled "GENERATING AUGMENTED REALITY CONTENT BASED ON USER-SELECTED PRODUCT DATA", which is incorporated by reference herein in its entirety.

BACKGROUND

Applications executed by client devices may be used to generate content. For example, client applications may be used to generate messaging content, image content, video content, audio content, media overlays, documents, creative works, combinations thereof, and the like. In various situations, client applications may also be used to purchase products from sellers of the products.

BRIEF DESCRIPTION OF THE DRAWINGS

In the drawings, which are not necessarily drawn to scale, like numerals may describe similar components in different views, To easily identify the discussion of any particular element or act, the most significant digit or digits in a reference number refer to the figure number in which that element is first introduced. Some implementations are illustrated by way of example, and not limitation.

DETAILED DESCRIPTION

Figure 1:
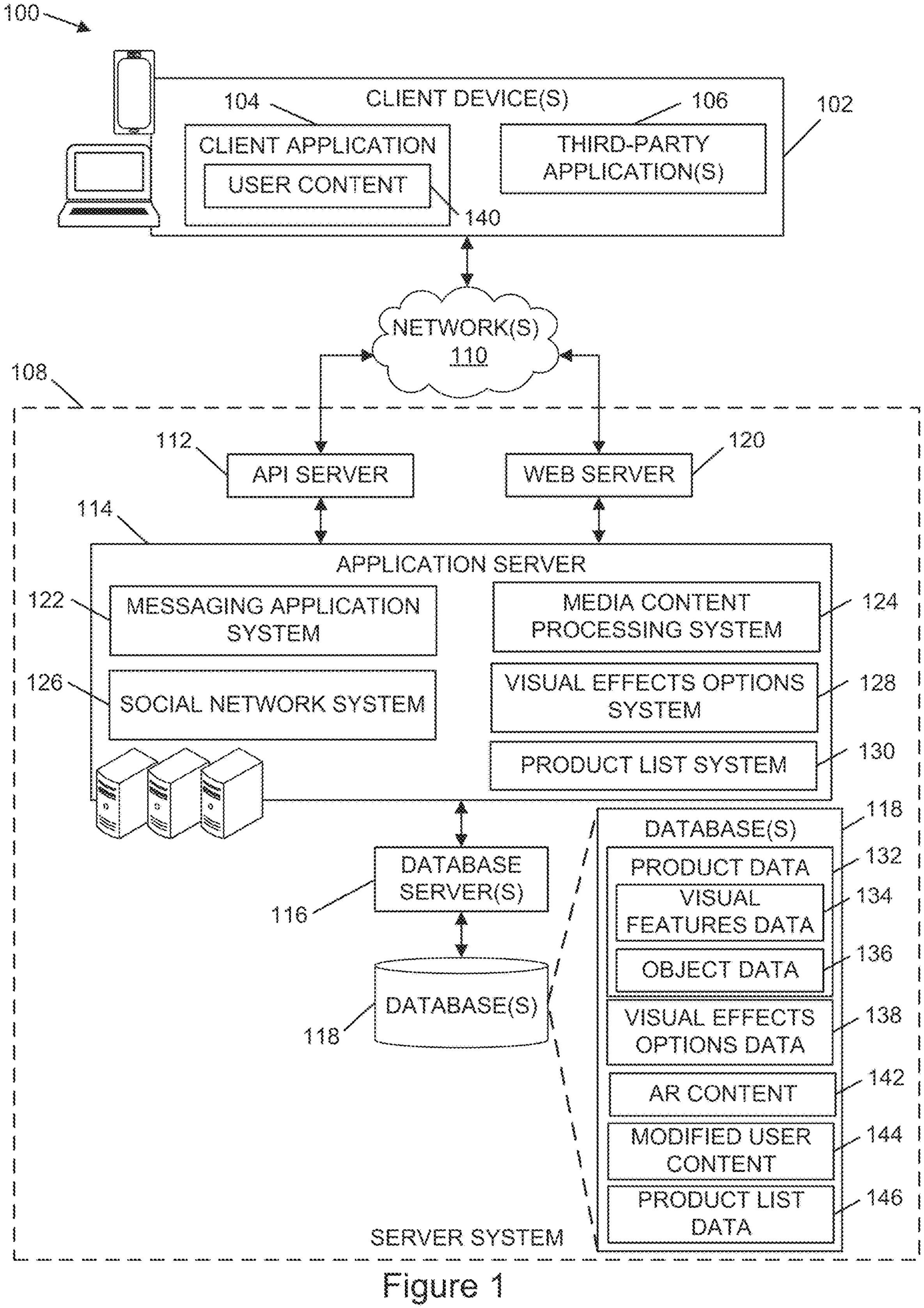
FIG. 1 is a diagrammatic representation of an architecture for exchanging data (e.g., messages and associated content) over a network, according to one or more example implementations.

Individuals may access content that includes information about a product. The information may include one or more images of other individuals using the product. In situations where the product is a beauty product, individuals may access content that shows the beauty product after being applied to additional individuals. For example, content may show beauty products, such as lip stick, eye shadow, foundation, concealer, powder, and the like, applied to a face of an individual. In many situations, the individual to which the beauty product is applied in the content has different facial characteristics than the individual viewing the content, these reasons, it can be challenging for individuals to visualize how a beauty product may look when applied to their face. Thus, purchasing beauty products can be performed in-person and may take place after some amount of experimentation with a sample of a beauty product.

In some existing systems, simulations may be produced that show one or more beauty products applied to a face of an individual. However, the individual to which the one or more beauty products are applied in the simulations is often not the user selecting the beauty products that are being applied in the simulation. In these situations, applying a beauty product to the face of the additional individual may not be reflective of how the beauty product would look when applied to the face of the user. In additional instances, existing systems may produce simulations of beauty products applied to the face of a user in a previously captured image of the user, but not a real-time image of the user. Existing systems are also typically limited in the number of sources of products that may be used to produce simulations. Further, the options for sharing simulations, sharing information about products used in the simulations, and interacting with other users of existing systems are typically limited.

The systems, methods, techniques, instruction sequences, and computing machine program products described herein are directed to generating augmented reality content based on user-selected product data. The augmented reality content may be implemented to cause changes to an appearance of one or more objects included in user content based on visual characteristics produced by applying the one or more products. In one or more examples, a server system may obtain information related to a number of products and generate a number of options that are selectable by a user of a client application to apply one or more features of the products with respect to an individual. The server system may analyze the information about the number of products and determine a number of visual effects that may be produced in relation to images of a user of a client application. In various examples, the visual effects may be produced by implementing augmented reality content that corresponds to one or more visual effects that are related to the options selected by the user to apply one or more products with respect to the user. In one or more illustrative examples, the client application may also include at least one of messaging functionality or social networking functionality. Thus, users may share product information with contacts of the users via at least one of messages or social networks. Users of the client application may also share content with contacts of the user that is generated when augmented reality content is implemented to apply one or more visual effects related to a product to at least one of image content or video content of users of the client application.

In one or more implementations, the server system may obtain information about a number of beauty products. The information may indicate characteristics of the beauty products, such as color, shading, texture, shimmer, matte, glossiness, thickness, one or more combinations thereof, and the like. The server system may determine visual effects of applying the beauty products to facial features of individuals. In various examples, the server system may determine modifications to the appearance of individuals when the beauty products are applied to the facial features of the individuals. Additionally, the server system may generate augmented reality content that may be implemented to produce the changes to the appearance of individuals the one or more beauty products are applied to the facial features of the individuals.

In one or more illustrative examples, a server system may obtain information about a number of beauty products having a respective classification. For example, the server system may obtain information about a number of concealers, In various examples, at least some of the concealers may be offered for purchase or manufactured by a same entity. In additional examples, at least a portion of the concealers may be offered for purchase or manufactured by a number of different entities. Further, the concealers may each be associated with a respective set of characteristics. In one or more implementations, concealers may have different characteristics based on different skin tones of individuals that may apply the concealers. The server system may generate a number of options that are displayed in a user interface and that are selectable by users of the client application to apply the concealers having the different characteristics to image content of the users. To illustrate, the server system may generate a first number of options that are selectable to apply concealers that correspond to lighter skin tones and a second number of options that are selectable to apply concealers that correspond to darker skin tones. Each selectable option may be associated with augmented reality content that may be implemented to modify the appearance of a user of the client application based on the characteristics of the selected concealer. In one or more examples, the augmented reality content may be implemented with respect to real-time image content captured by a camera of a client device that is executing an instance of the client application. The server system may also generate options that are selectable to apply visual effects related to other classifications of beauty products, such as lipstick, eye shadow, eye liner, and so forth. In this way, a user of the client application may select a number of options with respect to a number of different beauty products and create an ensemble appearance.

The server system may also determine the beauty products that correspond to the options selected by the user of the client application and provide information to the user related to the products. For example, the server system may determine pricing information, ratings, reviews, availability information, product names, product sellers, one or more combinations thereof, and so forth, to users of the client application based on the selections made by the respective users to apply the beauty products to the facial features of the users included in at least one of image content or video content. In various examples, the client application may display one or more user interfaces that show the information related to the beauty products corresponding to the selections of the users and that show options to purchase the beauty products corresponding to the selections of the users.

Accordingly, the systems, methods, techniques, instruction sequences, and computing machine program products described herein provide various implementations to aggregate information about a number of different products and generate augmented reality content that applies visual effects related to the products. In this way, the implementations described herein provide an efficient way to provide more options for modifying the appearance of users of a client application than existing systems and provide efficient techniques to purchase the products. Further, the implementations described herein enable users of a client application that has more robust capabilities than existing systems for sharing and modifying the content that is produced when visual effects related to products are applied to modify an appearance of individuals included in at least one of image content or video content. For example, the implementations described herein may be directed to a single application that has messaging functionality, social networking functionality, and functionality to alter the appearance of individuals in image content based on visual effects produced with respect to products that are offered for purchase via the client application. In addition, the client application may include functionality that is not present in existing systems that enables further modification of the content generated by applying visual effects from one or more products to user content, such as applying one or more additional overlays, one or more animations, or one or more filters.

FIG. 1 is a diagrammatic representation of an architecture 100 for exchanging data (e.g., messages and associated content) over a network. The architecture 100 may include multiple client devices 102. The client devices 102 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each client device 102 may host a number of applications, including a client application 104 and one or more third-party applications 106. A user may use the client application 104 to create content, such as video, images (e.g., photographs), audio, and media overlays. In one or more illustrative examples, the client application 104 may include a social networking functionality that enables users to create and exchange content. In various examples, the client application 104 may include messaging functionality that may be used to send messages between instances of the client application 104 executed by various client devices 102. The messages created using the client application 104 may include video, one or more images, audio, media overlays, text, content produced using one or more creative tools, annotations, and the like. In one or more implementations, the client application 104 may be used to view and generate interactive messages, view locations of other users of the client application 104 on a map, chat with other users of the client application 104, and so forth.

One or more users may be a person, a machine, or other means of interacting with a client device, such as the client device 102. In example implementations, the user may not be part of the architecture 100 but may interact with one or more components of the architecture 100 via a client device 102 or other means. In various examples, users may provide input (e.g., touch screen input or alphanumeric input) to a client device 102 and the input may be communicated to other entities in the architecture 100. In this instance, the other entities in the architecture 100, responsive to the user input, may communicate information to a client device 102 to be presented to the users. In this way, users may interact with the various entities in the architecture 100 using the client device 102.

Each instance of the client application 104 is able to communicate and exchange data with at least one of another instance of the client application 104, one or more third-party applications 106, or a server system 108. The data exchanged between instances of the client applications 104, between the third-party applications 106, and between instances of the client application 104 and the server system 108 includes functions (e.g., commands to invoke functions) and payload data (e.g., text, audio, image, video, or other multimedia data). Data exchanged between instances of the client applications 104, between the third-party applications 106, and between at least one instance of the client application 104 and at least one third-party application 106 may be exchanged directly from an instance of an application executed by a client device 102 and an instance of an application executed by an additional client device 102. Further, data exchanged between the client applications 104, between the third-party applications 106, and between at least one client application 104 and at least one third-party application 106 may be communicated indirectly (e.g., via one or more intermediate servers) from an instance of an application executed by a client device 102 to another instance of an application executed by an additional client device 102. In one or more illustrative examples, the one or more intermediate servers used in indirect communications between applications may be included in the server system 108.

The third-party application(s) 106 may be separate and distinct from the client application 104. The third-party application(s) 106 may be downloaded and installed by the client device 102 separately from the client application 104. In various implementations, the third-party application(s) 106 may be downloaded and installed by the client device 102 before or after the client application 104 is downloaded and installed. The third-party application(s) 106 may be an application that is provided by an entity or organization that is different from the entity or organization that provides the client application 104. The third-party application(s) 106 may be accessed by the client device 102 using separate login credentials than the client application 104. Namely, the third-party application(s) 106 may maintain a first user account and the client application 104 may maintain a second user account. In one or more implementations, the third-party application(s) 106 may be accessed by the client device 102 to perform various activities and interactions, such as listening to music, videos, track exercises, view graphical elements (e.g., stickers), communicate with other users, and so forth. As an example, the third-party application(s) 106 may include a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The server system 108 provides server-side functionality via one or more networks 110 to the client application 104. The server system 108 may be a cloud computing environment, according to some example implementations. For example, the server system 108, and one or more servers associated with the server system 108, may be associated with a cloud-based application, in one illustrative example. In one or more implementations, the client device 102 and the server system 108 may be coupled via the one or more networks 110.

The server system 108 supports various services and operations that are provided to the client application 104. Such operations include transmitting data to, receiving data from, and processing data generated by the client application 104. This data may include message content, media content, client device information, geolocation information, media annotation and overlays, message content persistence conditions, social network information, and live event information, as examples. Data exchanges within the architecture 100 are invoked and controlled through functions available via user interfaces (UIs) of the client application 104.

While certain functions of the architecture 100 are described herein as being performed by either a client application 104 or by the server system 108, the location of functionality either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 includes an Application Programming Interface (API) server 112 that is coupled to, and provides a programmatic interface to, an application server 114. The application server 114 is communicatively coupled to a database server 116 that facilitates access to one or more databases 118. The one or more databases 118 may store data associated with information processed by the application server 114. The one or more databases 118 may be storage devices that store information such as untreated media content, original media content from users (e.g., high-quality media content), processed media content e.g., media content that is formatted for sharing with client devices 102 and viewing on client devices 102), context data related to a media content item, context data related to a user device (e.g., a computing or client device 102), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 118 may further store information related to third-party servers, client devices 102, client applications 104, users, third-party applications 106, and so forth.

The API server 112 receives and transmits data (e.g., commands and message payloads) between client devices 102 and the application server 114. Specifically, the Application Program Interface (API) server 112 provides a set of interfaces (e.g., routines and protocols) that can be called or queried by the client application 104 in order to invoke functionality of the application server 114. The Application Program Interface (API) server 112 exposes various functions supported by the application server 114, including account registration, login functionality, the sending of messages, via the application server 114, from one instance of the client application 104 to another instance of the client application 104, the sending of media files (e.g., images, audio, video) from a client application 104 to the application server 114, and for possible access by another client application 104, the setting of a collection of media content (e.g., a gallery, story, message collection, or media collection), the retrieval of a list of friends of a user of a client device 102, the retrieval of such collections, the retrieval of messages and content, the adding and deletion of friends to a social graph, the location of friends within a social graph, and opening an application event (e.g., relating to the client application 104).

The server system 108 may also include a web server 120. The web server 120 is coupled to the application servers 114, and provides web-based interfaces to the application servers 114. To this end, the web server 120 processes incoming network requests over the Hypertext Transfer Protocol (HTTP) and several other related protocols.

The application server 114 hosts a number of applications and subsystems, including a messaging application system 122, a media content processing system 124, a social network system 126, a visual effects options system 128, and a product list system 130. The messaging application system 122 implements a number of message processing technologies and functions, particularly related to the aggregation and other processing of content (e.g., textual and multimedia content) included in messages received from multiple instances of the client application 104. For example, the messaging application system 122 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth). The messaging application system 122 may aggregate text and media content from multiple sources into collections of content. These collections are then made available, by the messaging application system 122, to the client application 104. Other processor- and memory-intensive processing of data may also be performed server-side by the messaging application system 122, in view of the hardware requirements for such processing.

The media content processing system 124 is dedicated to performing various media. content processing operations, typically with respect to images, audio, or video received within the payload of a message or other content item at the messaging application system 122. The media content processing system 124 may access one or more data storages (e.g., the database(s) 118) to retrieve stored data to use in processing media content and to store results of processed media content.

The social network system 126 supports various social networking functions and services, and makes these functions and services available to the messaging application system 122. To this end, the social network system 126 maintains and accesses an entity graph within the database(s) 118. Examples of functions and services supported by the social network system 126 include the identification of other users of the client application 104 with which a particular user has relationships or is "following", and also the identification of other entities and interests of a particular user. The social network system 126 may access location information associated with each of the user's friends or other social network connections to determine where they live or are currently located geographically. In addition, the social network system 126 may maintain a location profile for each of the user's friends indicating the geographical location where the user's friends live.

The visual effects options system 128 may obtain information about a number of products and generate visual effects that correspond to applying the products with respect to an individual or environment. The information obtained about the products may be stored as product data 132. The product data 132 may include one or more characteristics of one or more products offered for purchase via the client application 104. For example, the product data 132 may include at least one of identifiers of products, descriptions of products, pricing information of products, reviews of products, ratings of products, sellers of products, manufacturers of products, sizing information of products, or additional information that indicates visual characteristics of the products. The visual characteristics of the products may be stored as visual features data 134. The visual features data 134 may include at least one of color information, texture information, shape information, brightness information, shading information, shimmer information, matte information, or glossiness information, The product data 132 may also include object data 136. The object data 136 may indicate objects that are related to the products. To illustrate, the object data 136 may indicate objects to which at least a portion of the products may be applied. In situations where a product is a beauty product, the object data 136 may indicate a facial feature to which the beauty product is applied. For example, the object data 136 may indicate that lipstick is to be applied to lips of individuals or that eye shadow is to be applied to a region proximate to an eye of individuals. In scenarios where at least a portion of the products are articles of clothing or jewelry, the object data 136 may indicate parts of the body where the articles of clothing or jewelry are worn.

The object data 136 may also include one or more identifiers of one or more objects. For example, objects included in the object data 136 may associated with a classification. In various examples, an object included in the object data 136 may be classified according to a category related to the object. In one or more illustrative examples, one or more objects included in the object data 136 may be classified as a type of facial feature, such as eyes, nose, lips, chin, cheeks, forehead, and so forth. In one or more implementations, an object included in the object data 136 may be classified based on an amount of similarity in relation to an object included in a library of objects stored by the database(s) 118. In one or more examples, the library of objects stored by the database(s) 118 may indicate characteristics of objects and identifiers of objects.

In one or more examples, object data 136 may be determined based on metadata included in the product data 132. The metadata may indicate at least one of characteristics of products, identifiers of products, or classifications of products included in the product data 132. In one or more additional examples, image content included in the product data 132 may be analyzed to determine features of objects. For example, one or more object recognition techniques may be implemented with respect to the product data 132 to identify one or more objects included in the product data 132. These can include, for example, appearance-based processes that search for features such as edges, changes in lighting or color, or changes in shape or size. Various other techniques utilize gradient generation and matching or histogram analysis for object recognition. Other techniques include feature-based techniques, such as may utilize interpretation trees, geometric hashing, or invariance analysis. Moreover, techniques such as scale-invariant feature transform (SIFT) or speeded up robust features (SURF) techniques can also be used within the scope of the subject technology. In one or more illustrative examples, facial features of individuals included in the product data 132 may be detected. In these situations, a template matching technique, a neural network technique (e.g., using a deep neural network, or a convolutional neural network, and the like), a Fisher linear discriminant technique, a maximal rejection classifier technique, a support vector machine technique, an edge filtering technique, an edge detection technique, and the like, may be implemented to determine the facial features that may be related to products included in the product data 132.

The visual effects options system 128 may analyze the product data 132 to determine one or more visual effects that are related to the products. The visual effects may correspond to changes to an appearance of an individual or environment when the products are applied to the individual or the environment. For example, in situations where the products include a beauty product, the visual features may correspond to a change to a facial feature of an individual when the beauty product is applied to the face of the individual. In additional examples, when a product is an item of clothing or jewelry, the visual effects may indicate a change to an appearance of the individual when the item of clothing or jewelry is being worn by the individual. The visual features may include visual effects included in at least one of one or more images or one or more videos included in the product data 132. The visual features may indicate at least one of colors, shapes, shading, sizing, or textures related to objects included in the product data 132. In various examples, metadata corresponding to the product data 132 may indicate visual features corresponding to one or more objects included in the product data 132. In one or more additional examples, product data 132 may be analyzed to determine one or more visual features that are related to products included in the product data 132. For example, one or more of appearance-based processes that search for features such as edges, changes in lighting or color, or changes in shape or size may be implemented to determine visual effects related to products included in the product data 132. Various other techniques may be implemented that utilize gradient generation and matching or histogram analysis for identifying visual effects corresponding to one or more objects included in the product data 132.

The visual effects determined by the visual effects options system 128 may be stored as visual effects options data 138. The visual effects options data 138 may indicate visual effects that are selectable by a user of the client application 104 to modify image content according to the visual effects. In one or more illustrative examples, a user of the client application 104 may cause user content 140 to be generated that includes at least one of image content or video content. In various examples, the user content 140 may include real-time content captured in a field of view of a camera of the client device 102. In additional examples, the user content 140 may include at least one of image content or video content stored in memory of the client device 102 that was previously captured by a camera of the client device 102. In one or more examples, the visual effects options data 138 may correspond to user interface elements displayed by the client application 104 in conjunction with the user content 140 that are selectable to cause changes to the user content 140 based on visual effects related to the selected product. To illustrate, the visual effects options data 138 may correspond to user interface elements that are selectable to cause transformations of the user content 140 to occur that are related to at least one of a color, shape, size, shading, or texture related to an object included in the user content 140.

The visual effects options data 138 may correspond to augmented reality (AR) content 142. The AR content 142 may include at least one of filters, overlays, or other content that causes transformations with respect to the appearance of user content. In one or more examples, the AR content 142 may cause one or more effects to be applied to one or more objects included in the user content 140 based on the visual effects options selected by a user of the client application 104 to produce modified user content 144. In one or more illustrative examples, selection of a visual effects option to apply a shade of lipstick to lips of a user of the client application 104 included in the user content 140 may cause AR content 142 to be implemented, such as a filter or overlay, that modifies the appearance of the lips of the user in accordance with the shade of the lipstick.

In one or more implementations, the modified user content 144 that is generated by the AR content 142 may be shared by a user of the client application using at least one of messaging functionality or social networking functionality of the client application 104. For example, a user of the client application 104 may generate a message using the client application 104 that includes the modified user content 144 and send data corresponding to the message to the server system 108 with additional data that indicates one or more recipients of the message. The messaging application system 122 may then send the message including the modified user content 144 to one or more client devices 102 of the one or more recipients. The one or more recipients may then access the message using the client application 104. Additionally, a user of the client application 104 may share the modified user content 144 using social networking functionality of the client application 104. In one or more illustrative examples, a user of the client application 104 may generate social networking content, such as a post or message, that is accessible to one or more additional users of the client application 104 via the social networking functionality of the client application 104. In various examples, the social network system 126 may make social networking content that includes the modified user content 144 accessible to one or more contacts of the user of the client application 104 that generated the social networking content including the modified user content 144.

The product list system 130 may determine one or more products that are used to produce the modified user content 144. For example, the product list system 130 may determine one or more products that correspond to one or more visual effects that are applied to the user content 140 to produce the modified user content 144 based on selection of the one or more visual effects by a user of the client application 104. The product list system 130 may generate the product list data 146. The product list data 146 may include information about the one or more products used to produce the visual effects that modify the user content 140 to produce the modified user content 144. For example, a user of the client application 104 may select visual effects options corresponding to a shirt, pants, and shoes having various characteristics. The user content 140 may be modified such that the modified user content 144 includes a user of the client application 104 wearing the shirt, pants, and shoes. The product list system 130 may determine the product list data 146 based on portions of the product data 132 that correspond to the shirt, pants, and shoes. To illustrate, the product list system 130 may determine an identifier, brand, or name of each of the shirt, pants, and shoes based on the product data 132. The product list system 130 may also determine pricing information, sizing information, ratings, reviews, description information, one or more combinations thereof, and the like, for the shirt, pants, and shoes. Continuing with this example, the product list system 130 may store the information related to the shirt, pants, and shoes as at least a portion of the product list data 146 and generate one or more user interfaces that include the portion of the product list data 146 corresponding to the shirt, pants, and shoes. In one or more examples, the one or more user interfaces may include one or more user interface elements that are selectable to initiate a financial transaction to purchase at least one of the shirt, pants, or shoes.

Figure 2:
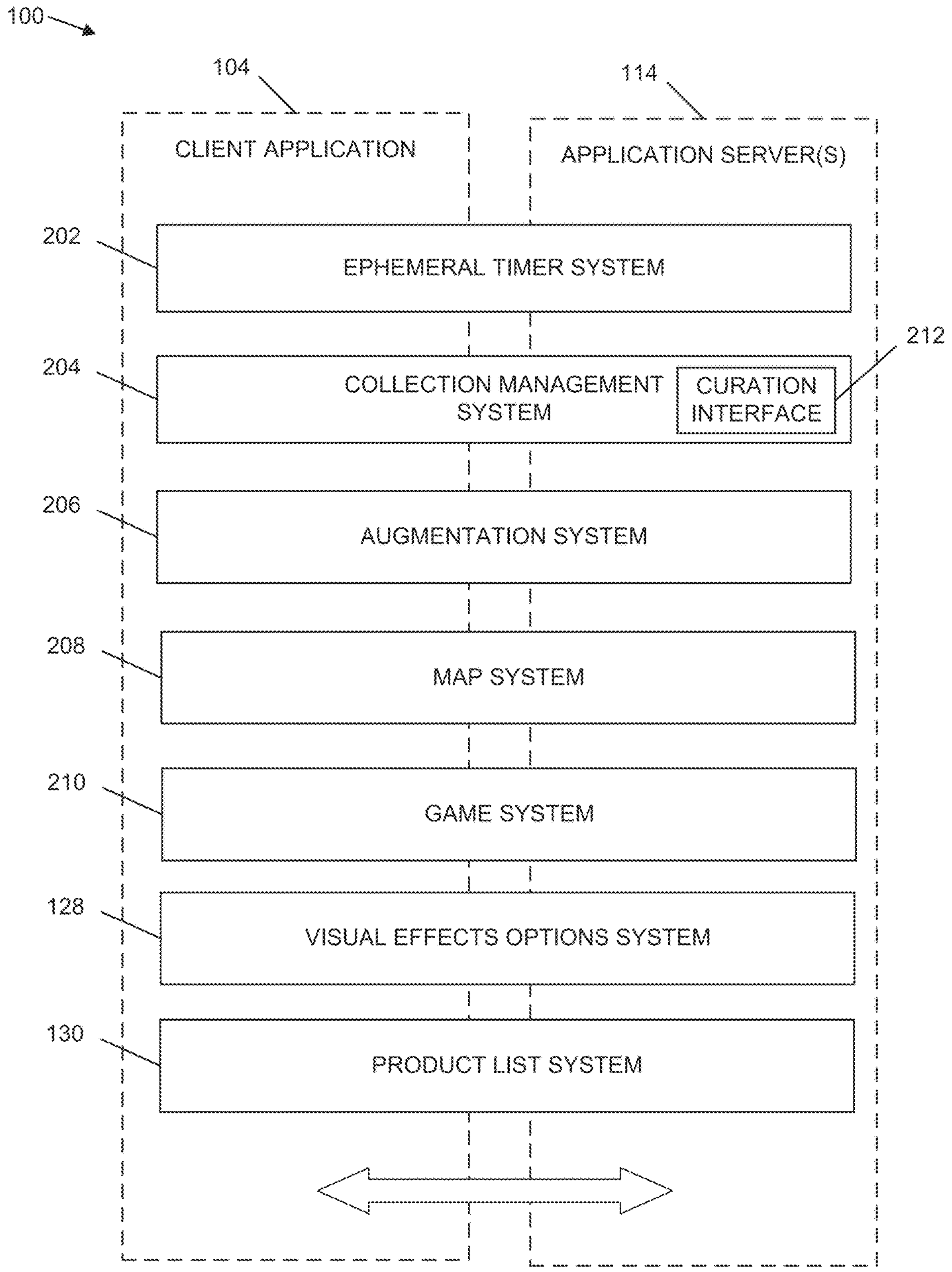
FIG. 2 is a diagrammatic representation of a system, in accordance with some examples, that may have both client-side and server-side functionality.

FIG. 2 is a block diagram illustrating further details regarding the server system 108, according to some examples. Specifically, the server system 108 is shown to comprise the client application 104 and the application servers 114. The server system 108 embodies a number of subsystems, which are supported on the client-side by the client application 104 and on the sever-side by the application servers 114. These subsystems include, for example, an ephemeral timer system 202, a collection management system 204, an augmentation system 206, a map system 208, a game system 210, the visual effects options system 128, and the product list system 130.

The ephemeral timer system 202 is responsible for enforcing the temporary or time-limited access to content by the client application 104 and the messaging application system 122. The ephemeral timer system 202 incorporates a number of timers that, based on duration and display parameters associated with a message, or collection of messages (e.g., a story), selectively enable access (e.g., for presentation and display) to messages and associated content via the client application 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the client application 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with content produced via the client application 104, such as a message. For example, the augmentation system 206 provides functions related to the generation and publishing of media overlays for content processed by the server system 108. The augmentation system 206 operatively supplies a media overlay or augmentation (e.g., an image filter) to the client application 104 based on a geolocation of the client device 102. In another example, the augmentation system 206 operatively supplies a media overlay to the client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database(s) 118 and accessed through the database server(s) 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the client application 104. For example, the map system 208 enables the display of user icons or avatars (e.g., stored in profile data 308 of FIG. 3) on a map to indicate a current or past location of "friends" of a user, as well as media content (e.g., collections of messages including photographs and videos) generated by such friends, within the context of a map. For example, a message posted by a user to the server system 108 from a specific geographic location may be displayed within the context of a map at that particular location to "friends" of a specific user on a map interface of the client application 104. A user can furthermore share his or her location and status information (e.g., using an appropriate status avatar) with other users of the server system 108 via the client application 104, with this location and status information being similarly displayed within the context of a map interface of the client application 104 to selected users.

The game system 210 provides various gaming functions within the context of the client application 104. The client application 104 provides a game interface providing a list of available games that can be launched by a user within the context of the client application 104, and played with other users of the server system 108. The server system 108 further enables a particular user to invite other users to participate in the play of a specific game, by issuing invitations to such other users from the client application 104. The client application 104 also supports both the voice and text messaging (e.g., chats) within the context of gameplay, provides a leaderboard for the games, and also supports the provision of in-game rewards (e.g., coins and items).

The visual effects options system 128 may determine visual effects related to one or more products and to determine options that are selectable to apply the visual effects to one or more objects included in user content. The augmentation system 206 may generate augmented reality content that corresponds to the visual effects associated with one or more of the visual effects options. In one or more examples, selection of a visual effects option may trigger the implementation of augmented reality content to cause one or more transformations of user content to take place that are related to the visual effects corresponding to the selected visual effects option. In this way, the visual effects options system 128 may operate in conjunction with the augmentation system 206 to modify user content in relation to visual effects that correspond to applying characteristics of one or more products to one or more objects included in user content. The product list system 130 may operate in conjunction with the visual effects options system 128 to determine one or more products that correspond to visual effects options that have been selected by users of the client application 104. The product list system 130 may then provide a list of the products used by individuals to modify user content. In various examples, the products may be available for purchase via the client application 104.

Figure 3:
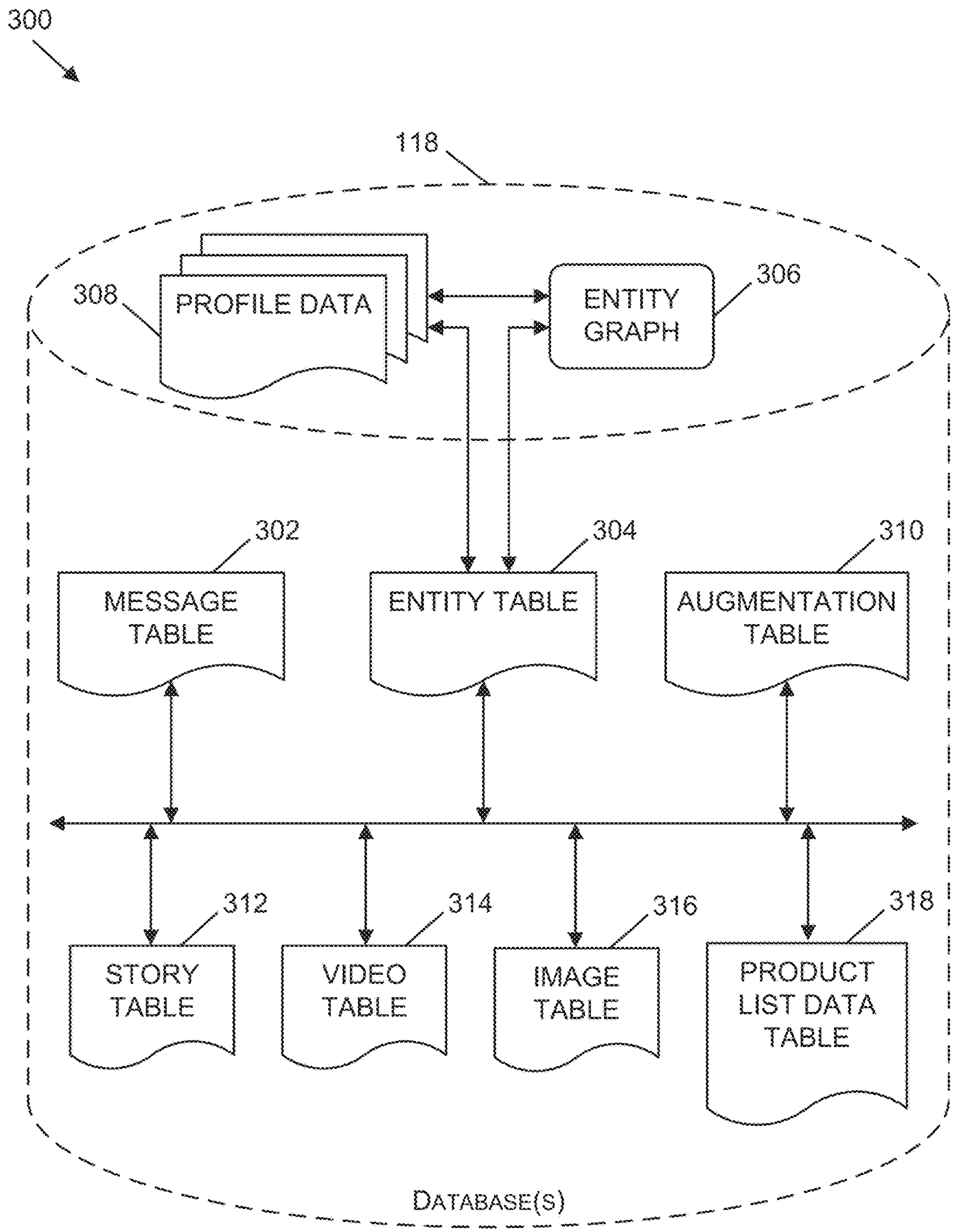
FIG. 3 is a schematic diagram illustrating data that may be stored in a database of a server system, according to one or more example implementations.

FIG. 3 is a schematic diagram illustrating data structures 300 which may be stored in the database(s) 118 of the server system 108, according to one or more example implementations. While the content of the database(s) 118 is shown to comprise a number of tables, it will be appreciated that the data could be stored in other types of data structures (e.g., as an object-oriented database).

The database 118 includes message data stored within a message table 302. This message data includes, for any particular one message, at least message sender data, message recipient (or receiver) data, and a payload.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the architecture 100, based on privacy settings specified by a particular entity. Where the entity is an individual, the profile data 308 includes, for example, a username, telephone number, address, settings (e.g., notification and privacy settings), as well as a user-selected avatar representation (or collection of such avatar representations). A particular user may then selectively include one or more of these avatar representations within the content of messages or other data communicated via the architecture 100, and on map interfaces displayed by client application 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 118 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the client application 104 when the sending user is composing a message. Other types of filters include geolocation filters (also known as geo-filters), which may be presented to a sending user based on geographic location. For example, geolocation filters specific to a neighborhood or special location may be presented within a user interface by the client application 104, based on geolocation information determined by a Global Positioning System (GPS) unit of the client device 102.

Another type of filter is a data filter, which may be selectively presented to a sending user by the client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications.

This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various implementations, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various implementations, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some implementations, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In various examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In one or more systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

A computer animation model to transform image data can be used by a system where a user may capture an image or video stream of the user (e.g., a selfie) using a client device 102 having a neural network operating as part of a client application 104 operating on the client device 102. The transformation system operating within the client application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various implementations, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some implementations, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the client application 104, to contribute content to a particular live story. The live story may be identified to the user by the client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

The database(s) 118 may also store a product list data table 318. The product list data table 318 may store lists of products with individual products in each list being applied to generate modified versions of user content. For example, products included in lists of the product list data table 318 may be related to one or more visual effects that are applied to objects in user content in order to generate modified versions of the user content.

Figure 4:
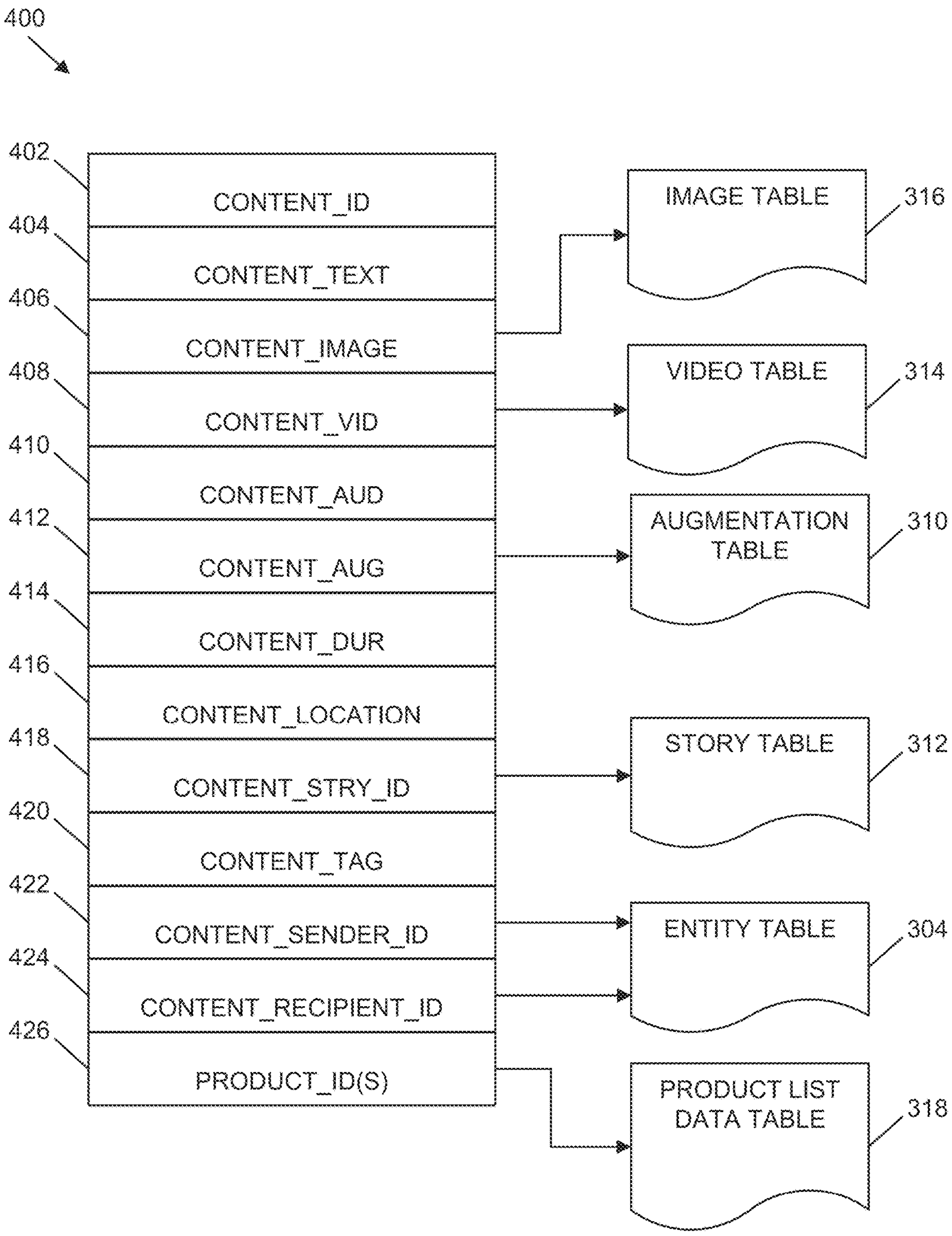
FIG. 4 is a schematic diagram illustrating an example framework for content that may be generated by a client application, in accordance with one or more example implementations.

FIG. 4 is a schematic diagram illustrating an example framework for content 400, according to some implementations. The content 400 may be generated by the client application 104. In various examples, the content 400 may be generated by a first instance of the client application 104 and communicated to at least one of a second instance of the client application 104 or the server system 108. In situations where the content 400 includes a message, the content 400 may be used to populate the message table 302 stored within the database(s) 118 and accessible by the application server 114. In one or more implementations, the content 400 may be stored in memory as "in-transit" or "in-flight" data of at least one of client devices 102 or the application server 114. The content 400 is shown to include at least a portion of the following components:

content identifier 402: a unique identifier that identifies the content 400.

content text payload 404: text, to be generated by a user via a user interface of the client device 102, and that is included in the content 400.

content image payload 406: image data, captured by a camera component of a client device 102 or retrieved from a memory component of a client device 102, and that is included in the content 400. Image data for a sent or received content 400 may be stored in the image table 316.

content video payload 408: video data, captured by a camera component or retrieved from a memory component of the client device 102, and that is included in the content 400. Video data for a sent or received content 400 may be stored in the video table 314.

content audio payload 410: audio data, captured by a microphone or retrieved from a memory component of the client device 102, and that is included in the content 400.

content augmentation data 412: augmentation data (e.g., filters, stickers, or other annotations or enhancements) that represents augmentations to be applied to content image payload 406, content video payload 408, or content audio payload 410 of the content 400. Augmentation data for a sent or received content 400 may be stored in the augmentation table 310.

content duration parameter 414: parameter value indicating, in seconds, the amount of time for which one or more portions of the content 400 (e.g., the content image payload 406, content video payload 408, content audio payload 410) are to be presented or made accessible to a user via the client application 104.

content geolocation parameter 416: geolocation data (e.g., latitudinal and longitudinal coordinates) associated with the content payload of the message. Multiple content geolocation parameter 416 values may be included in the payload, each of these parameter values being associated with respect to content items included in the content (e.g., a specific image into within the content image payload 406, or a specific video in the content video payload 408).

content story identifier 418: identifier values identifying one or more content collections (e.g., "stories" identified in the story table 312) with which a particular item in the content image payload 406 of the content 400 is associated. For example, multiple images within the content image payload 406 may each be associated with multiple content collections using identifier values.

content tag 420: each content 400 may be tagged with multiple tags, each of which is indicative of the subject matter of content included in the content payload. For example, where a particular image included in the content image payload 406 depicts an animal (e.g., a lion), a tag value may be included within the content tag 420 that is indicative of the relevant animal. Tag values may be generated manually, based on user input, or may be automatically generated using, for example, image recognition.

content sender identifier 422: an identifier (e.g., a messaging system identifier, email address, or device identifier) indicative of a user of the client device 102 on which the content 400 was generated and from which the content 400 was sent.

content receiver identifier 424: an identifier (e.g., a messaging system identifier, email address, or device identifier) indicative of a user of the client device 102 to which the content 400 is addressed.

product identifier(s) 426: an identifier of a product or multiple identifiers of multiple products that are included in product lists stored by the product list data table 318. In one or more illustrative examples, a product identifier 426 may indicate an identifier of a product related to one or more visual effects applied to at least one of image content or video content of the content 400.

The data (e.g., values) of the various components of content 400 may correspond to pointers to locations in tables within which the data is stored. For example, an image value in the content image payload 406 may be a pointer to (or address of) a location within an image table 316. Similarly, values within the content video payload 408 may point to data stored within a video table 314, values stored within the content augmentations 412 may point to data stored in an augmentation table 310, values stored within the content story identifier 418 may point to data stored in a story table 312, and values stored within the content sender identifier 422 and the content recipient identifier 424 may point to user records stored within an entity table 304. Further, values of the product identifier(s) 426 may point to data stored within a data structure that includes the product list data table 318.

Figure 5:
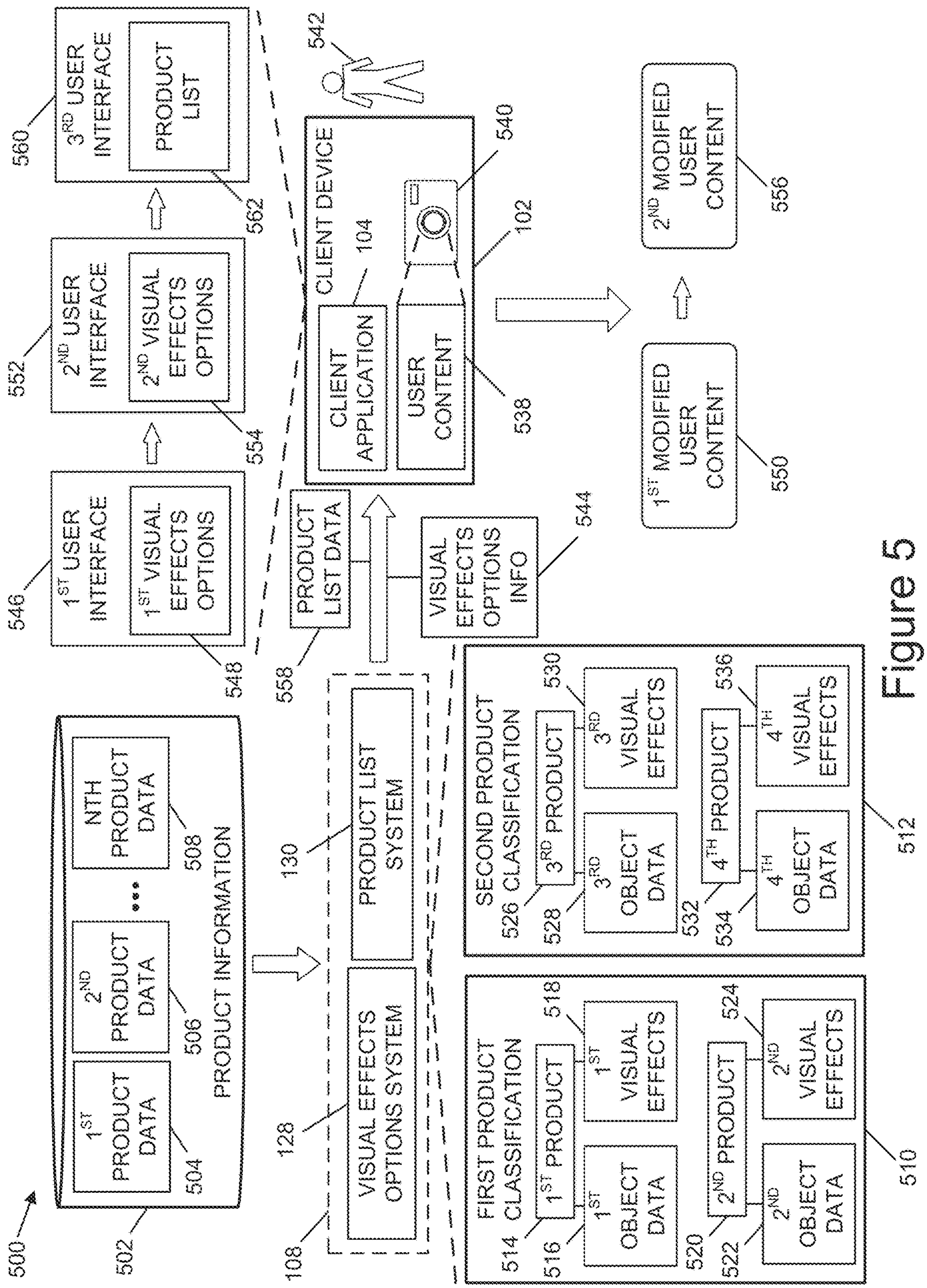
FIG. 5 is a diagrammatic representation illustrating an architecture to determine one or more products used to modify an appearance of an individual using augmented reality content, in accordance with one or more example implementations.

FIG. 5 is a diagrammatic representation illustrating an architecture 500 to determine one or more products used to modify an appearance of an individual using augmented reality content, in accordance with one or more example implementations. The architecture 500 may include product information 502. The product information 502 may include information related to one or more products offered for purchase via the client application 104. For example, the product information 502 may include at least one of product description information, product pricing information, product reviews, product ratings, identifiers of products, sellers of products, manufacturers of products, or availability information of products. In one or more examples, the product information 502 may include at least one of text content, video content, audio content, or image content corresponding to products offered for purchase via the client application 104.

In the illustrative example of FIG. 5, the product information 502 may include first product data 504, second product data 506, up to $N^{th}$ product data 508. The first product data 504 may include information about a first product offered for purchase via the client application 104 and the second product data 506 may include information about a second product offered for purchase via the client application 104. In addition, the $N^{th}$ product data 508 may include information related to an $N^{th}$ product that is available for purchase via the client application 104. In various examples, at least one of the products included in the product information 502 are beauty products.

The product information 502 may be obtained by the server system 108. In one or more examples, the product information 502 may be obtained from a third-party that aggregates information about a number of products. In one or more additional examples, the product information 502 may be obtained from at least one of sellers of products, manufacturers of products, or users of products. In one or more implementations, the product information 502 may be obtained using application programming interface (API) calls related to APIs implemented by entities that provide the product information 502, such as third-party product information aggregators, product sellers, product manufacturer, or one or more combinations thereof.

The server system 108 may analyze the product information 502 to determine visual effects that may be produced when products are applied to content related to users of the client application 104. In various examples, the visual effects options system 128 may analyze the product information 502 to determine the visual effects produced in response to applying characteristics of products to content related to users of the client application 104. The visual effects may modify an appearance of portions of content related to the client application 104. To illustrate, the visual effects may modify at least one of color, texture, shading, or other visual characteristics of portions of content related to the client application 104. In one or more examples, the visual effects may alter an appearance of objects included in content related to the client application 104. For example, the visual effects may modify an appearance of a facial feature of an individual or a region proximate to a facial feature of an individual included in content related to the client application 104.

In one or more examples, the visual effects options system 128 may implement at least one of one or more color recognition techniques, one or more texture recognition techniques, one or more shading recognition techniques, or one or more edge detection techniques, to determine one or more visual effects produced when products are applied to content related to the client application 104. The visual effects options system 128 may also analyze metadata included in the product information 502 to determine one or more visual effects associated with a product. In one or more illustrative examples, the first product data 504 may include metadata that indicates one or more visual effects associated with a first product. The metadata may be provided by at least one of a manufacturer of the first product or a seller of the first product. In additional examples, the metadata may be provided by an aggregator of product information. In further examples, the visual effects options system 128 may determine visual effects related to an individual product based on input obtained from a representative of a service provider implementing the server system 108. For example, a representative of a service provider that implements the server system 108 may examine information related to one or more products and provide input via one or more input devices of a computing device that indicates visual effects produced in response to the one or more products being applied to one or more objects or environments.

Additionally, the visual effects options system 128 may analyze the product information 502 to determine one or more objects with an appearance that is modified based on the products being applied to the objects. Examples of object recognition techniques implemented to determine one or more objects having an appearance modified by one or more products may include appearance-based processes that search for features such as edges, changes in lighting or color, or changes in shape or size. Various other techniques utilize gradient generation and matching or histogram analysis for object recognition. Other techniques include feature-based techniques, such as may utilize interpretation trees, geometric hashing, or invariance analysis. Moreover, techniques such as scale-invariant feature transform (SIFT) or speeded up robust features (SURF) techniques can also be used within the scope of the subject technology. Further, a template matching technique, a neural network technique (e.g., using a deep neural network, or a convolutional. neural network, and the like), a Fisher linear discriminant technique, a maximal rejection classifier technique, a support vector machine technique, an edge filtering technique, an edge detection technique, and the like, may be implemented to determine one or more objects having an appearance that may be modified by the visual effects corresponding to one or more products included in the product information 502.

The visual effects options system 128 may also classify products included in the product information 502. The visual effects options system 128 may determine classifications for products based on characteristics of the products. In one or more examples, the visual effects options system 128 may determine classifications of products based on measures of similarity between characteristics of products. For example, the visual effects options system 128 may analyze first characteristics of a first product and second characteristics of a second product to determine a measure of similarity between the first product and the second product. In situations where the measure of similarity satisfies a threshold measure of similarity, the visual effects options system 128 may determine that the first product and the second product are included in a same classification.

In additional examples, individual classifications may be associated with one or more criteria. In these scenarios, the visual effects options system 128 may analyze characteristics of a product with respect to the criteria of a classification and determine a measure of similarity between the characteristics of the product and criteria of the classification. In situations where the measure of similarity satisfies a threshold measure of similarity, the visual effects options system 128 may determine that the product is included in the classification. In further examples, visual effects options system 128 may determine respective classifications of products based on classification identifiers included in the product information. To illustrate, the first product data 504 may indicate that a first product is classified as a first piece of clothing, such as a shirt, and the second product data 506 may indicate that a second product is classified as a second piece of clothing, such as pants. In another illustrative example, the first product data 504 may indicate that a first product is classified as a first beauty product, such as concealer, and the second product data 506 may indicate that a second product is classified as a second beauty product, such as eye shadow.

The visual effects options system 128 may determine at least a first product classification 510 and a second product classification 512. Although the illustrative example of FIG. 5 shows the first product classification 510 and the second product classification 512, the visual effects options system 128 may determine more classifications for products included in the product information 502. The first product classification 510 includes a first product 514. The first product 514 may be related to first object data 516 and first visual effects 518. The first object data 516 may indicate one or more objects having an appearance that may be altered by applying the first product 514 to one or more objects. The first visual effects 518 may indicate modifications to the appearance of the objects included in the first object data 516. For example, an object included in the first object data 516 may have an appearance that is altered based on at least one of the first visual effects 518 in response to applying the first product 514 to the object.

Additionally, the first product classification 510 may also include a second product 520. The second product 520 may be related to second object data 522 and second visual effects 524. The second object data 522 may indicate one or more objects having an appearance that may be altered by applying the second product 520 to the one or more objects. The second visual effects 524 may indicate modifications to the appearance of the objects included in the second object data 522. Although the illustrative example of FIG. 5 shows a first product 514 and a second product 520 in the first product classification 510, the first product classification 510 may include one or more additional products and respective object data and visual effects that correspond to the one or more additional products.

The second product classification 512 may include a third product 526. The third product 526 may be related to third object data 528 and third visual effects 530. The third object data 528 may indicate one or more objects having an appearance that may be altered by applying the third product 526 to the one or more objects. The third visual effects 530 may indicate modifications to the appearance of the objects included in the third object data 528. For example, an object included in the third object data 528 may have an appearance that is altered based on at least one of the third visual effects 530 in response to applying the third product 526 to the object.

Additionally, the second product classification 512 may also include a fourth product 532. The fourth product 532 may be related to fourth object data 534 and fourth visual effects 536. The fourth object data 534 may indicate one or more objects having an appearance that may be altered by applying the fourth product 532 to one or more objects. The fourth visual effects 536 may indicate modifications to the appearance of the objects included in the fourth object data 534. Although the illustrative example of FIG. 5 shows a third product 526 and a fourth product 532 in the second product classification 512, the second product classification 512 may include one or more additional products and respective object data and visual effects that correspond to the one or more additional products.

In one or more illustrative examples, the first product classification 510 and the second product classification 512 may correspond to beauty products. For example, the first product classification 510 may correspond to lipstick and the second product classification 512 may correspond to eye shadow. lii these situations, the first product 514 may include first lipstick and the second product 520 may include second lipstick. In these examples, the first visual effects 518 of the first product 514 may have a first set of characteristics and the second visual effects 524 of the second product 520 may have a second set of characteristics. To illustrate, the first visual effects 518 may have a first color, first shimmer, first gloss, first texture, or one or more combinations thereof, and the second visual effects 524 may have a second color, second shimmer, second gloss, second texture or one or more combinations thereof. In this way, applying the first product 514 to lips of an individual may modify the appearance of the lips of the individual in a manner that is different from applying the second product 520 to lips of the individual. In various examples, the first product 514 and the second product 520 may be manufactured by a same manufacturer. The first product 514 and the second product 520 may also be available for purchase via one or more sellers that are the same. In additional examples, the first product 514 and the second product 520 may be manufactured by different manufacturers. The first product 514 and the second product 520 may also be available for purchase by different sellers. In one or more implementations, the products included in the first product classification 510 may include a collection of lipstick that may comprise a palette having a number of different color, shading, texture, or gloss characteristics that modify an appearance of lips of an individual.

In one or more additional illustrative examples, the third product 526 may include first eye shadow and the fourth product 532 may include second eye shadow. In these examples, the third visual effects 530 of the third product 526 may have a first set of characteristics and the fourth visual effects 536 of the fourth product 532 may have a second set of characteristics. To illustrate, the third visual effects 530 may have a first color, first shade, first range of thicknesses, first texture, or one or more combinations thereof, and the fourth visual effects 536 may have a second color, second shade, second range of thicknesses, second texture or one or more combinations thereof. In this way, applying the third product 526 to a region around an eye of an individual may modify the appearance of the region in a manner that is different from applying the fourth product 532 to a region of an eye of the individual. In various examples, the third product 526 and the fourth product 532 may be manufactured by a same manufacturer. The third product 526 and the fourth product 532 may also be available for purchase via one or more sellers that are the same. In additional examples, the third product 526 and the fourth product 532 may be manufactured by different manufacturers. The third product 526 and the fourth product 532 may also be available for purchase by different sellers, In one or more implementations, the products included in the second product classification 512 may include a collection of eye shadow that may comprise a palette having a number of different color, shading, ranges of thicknesses, or texture characteristics that modify an appearance of a region around an eye of an individual.

The client device 102 may store or display user content 538. The user content 538 may be captured by a camera 540 of the client device 102. In one or more examples, the user content 538 may include at least one of image content, video content, or audio content. The client device 102 may be operated by a user 542 to capture the user content 538. Additionally, the user content 538 may include real-time content captured in a field of view of the camera 540. In further examples, the user content 538 may include content previously captured via the camera 540 and stored in memory of the client device 102. In various examples, the user content 538 may be at least one of captured or displayed via the client application 104.

The server system 108 may send visual effects options information 544 to the client device 102. In one or more examples, the user 542 may cause the client application 104 to request the visual effects options information 544 from the server system 108. For example, the user 542 may cause the client application 104 to request information corresponding to options that are selectable to modify an appearance of at least a portion of the user content 538. To illustrate, the user 542 may send a request to the server system 108 via the client application 104 to determine how the appearance of at least a portion of the user content 538 may be modified when a product is applied to the portion of the user content 538. In one or more illustrative examples, the user 542 may cause the client application 104 to request information indicating how one or more facial features of the user 542 may be modified in response to one or more beauty products being applied to the one or more facial features.

The client application 104 may generate a first user interface 546. The first user interface 546 may display the first visual effects options 548. The first visual effects options 548 may be generated based on the visual effects options information 544. In one or more examples, the first user interface 546 may also show at least a portion of the user content 538. In one or more examples, the first user interface 546 may include a magnified version of a portion of the user content 538. In one or more illustrative examples, the first visual effects options 548 may indicate a range of visual effects that may be applied to one or more objects included in the user content 538. The first visual effects options 548 may include user interface elements that are selectable to apply one or more visual effects to the user content 538. The first visual effects options 548 may also be related to one or more products that may be applied to produce the visual effects corresponding to the first visual effects options 548. In various examples, selection of a user interface element corresponding to at least one of the first visual effects options 548 may cause a visual effect related to the product to be applied to an object included in the user content 538. To illustrate, selection of a user interface element corresponding to one of the first visual effects options 548 may cause augmented reality content, such as a filter or overlay, to be implemented to modify the appearance of at least one object included in the user content 538. Applying the visual effect to the object included in the user content 538 may cause the client application 104 to generate first modified user content 550. In this way, the first modified user content 550 may correspond to a modified version of the user content 538 with at least one of the first visual effects options 548 applied to at least one object included in the user content 538. The first modified user content 550 may include a modified version of real-time content included in a field of view of the camera 540 based on the selection by the user 542 of at least one user interface element corresponding to at least one first visual effects options 548.

In one or more implementations, in response to selection of at least one of the first visual effects options 548, at least one of the client application 104 or the server system 108 may determine an object that is associated with a selected one of the first visual effects options 548. For example, in response to selection of one of the first visual effects options 548 that corresponds to a first visual effect 518 of the first product 514, at least one of the client application 104 or the server system 108 may identify an object included in the first object data 516. In one or more illustrative examples, selection of one of the first visual effects options 548 corresponding to lip gloss may cause at least one of the client application 104 or the server system 108 to determine that lip gloss is associated with lips. At least one of the client application 104 or the server system 108 may then identify lips within the user content 538. After identifying lips within the user content 538, at least one of the client application 104 or the server system 108 may cause one or more visual effects corresponding to the selected first visual effects options 548 to be applied to the lips identified in the user content 538 by modifying an appearance of the lips.

In various examples, at least one of the client application 104 or the server system 108 may implement one or more object recognition techniques to identify one or more objects included in the user content that correspond to at least one object related to the selected first visual effects options 548. In one or more implementations, object recognition techniques implemented by at least one of the client application 104 or the server system 108 to identify an object included in the user content 538 that corresponds to an object related to a selected first visual effects options 548 may include appearance-based processes that search for features such as edges, changes in lighting or color, or changes in shape or size. Various other techniques utilize gradient generation and matching or histogram analysis for object recognition. Other techniques include feature-based techniques, such as may utilize interpretation trees, geometric hashing, or invariance analysis. Moreover, techniques such as scale-invariant feature transform (SIFT) or speeded up robust features (SURF) techniques can also be used within the scope of the subject technology. Further, a template matching technique, a neural network technique (e.g., using a deep neural network, or a convolutional neural network), and the like), a Fisher linear discriminant technique, a maximal rejection classifier technique, a support vector machine technique, an edge filtering technique, an edge detection technique, and the like.

The client application 104 may also generate a second user interface 552. The second user interface 552 may display the second visual effects options 554, The second visual effects options 554 may be generated based on the visual effects options information 544. In one or more illustrative examples, the second visual effects options 554 may indicate a range of visual effects that may be applied to one or more objects included in the user content 538 or to the first modified user content 550. The second visual effects options 554 may include user interface elements that are selectable to apply one or more visual effects to the user content 538 or to the first modified user content 550. The second visual effects options 554 may also be related to one or more products that may be applied to produce the visual effects corresponding to the second visual effects options 554. In various examples, selection of a user interface element corresponding to one of the second visual effects options 554 may cause a visual effect related to the product to be applied to an object included in the user content 538 or the first modified user content 550. To illustrate, selection of a user interface element corresponding to at least one of the second visual effects options 554 may cause augmented reality content, such as a filter or overlay, to be implemented to modify the appearance of at least one object included in the user content 538 or the first modified user content 550. Applying the visual effect to the object included in the user content 538 or the first modified user content 550 may cause the client application 104 to generate second modified user content 556. In this way, the second modified user content 556 may correspond to a modified version of the user content 538 or a modified version of the first modified user content 550 with at least one of the second visual effects options 554 applied to at least one additional object included in the user content 538 or the first modified user content 550.

In one or more examples, the second user interface 552 may also show at least a portion of the user content 538. In one or more implementations, the second user interface 552 may show a magnified version of at least a portion of the user content 538. The second modified user content 556 may include a modified version of real-time content included in a field of view of the camera 540 based on the selection by the user 542 of at least one user interface element corresponding to at least one second visual effect options 554. In various examples, the second user interface 552 may show at least a portion of the first modified user content 550. In these situations, the modifications may to the user content 538 in response to selection of at least one of the first visual effects options 548 may be shown in the second user interface 552. In one or more examples, the first visual effects options 548 may correspond to visual effects produced by products included in the first product classification 510 and the second visual effects options 554 may correspond to visual effects produced by products included in the second product classification 512. By applying both of one or more of the first visual effects options 548 and one or more second visual effects options 554, an ensemble appearance may be created with respect to the user content 538. Thus, the user 542 may build on the modified appearance of one or more objects in the user content 538 in response to selection of at least one first visual effects options 548 by selecting at least one second visual effects options 554 to apply with respect to an object included in the first modified user content 550. In one or more illustrative examples, the first visual effects options 548 may correspond to visual effects produced in response to lipstick being applied to lips of the user 542 and the second visual effects options may correspond to visual effects produced in response to eye shadow being applied to a region proximate to the eyes of the user 542. In these scenarios, the first modified user content 550 may show lipstick corresponding to a selected one of the first visual effects options 548 applied to the lips of the user 542 and the second modified user content 556 may show both the lipstick corresponding to the selected one of the first visual effects options 548 applied to the lips of the user 542 and eye shadow corresponding to a selected one of the second visual effects options 554 applied to regions proximate to the eyes of the user 542.

Additionally, product list system 130 may determine one or more products applied to content generated by the client application 104. In the illustrative example of FIG. 5, the product list system 130 may generate a list that includes products used to modify an appearance of one or more objects included in the user content 538. For example, the product list system 130 may obtain information indicting selection of at least one first visual effects options 548. The product list system 130 may also obtain information indicating selection of at least one second visual effect options 554. The product list system 130 may determine products corresponding to at least one of a first visual effect options 548 or a second visual effect options 554 applied to the user content 538 or the first modified user content 550. The product list system 130 may also obtain information related to the products from the product information 502. The product list system 130 may then generate the product list data 558 that includes a list of products and information related to the products included in the list, where the list of products includes one or more products applied to modify an appearance of one or more objects included in at least one of the user content 538 or the first modified user content 550. The product list data 558 may be sent to the client device 102 in response to a request from the client device 102 to obtain information related to one or more products used to create one or more visual effects with respect to one or more objects included in the user content 538 or the first modified user content 550.

The client application 104 may generate a third user interface 560. The third user interface 560 may include a product list 562. The product list 562 may be generated by the client application 104 using the product list data 558. The product list 562 may include identifiers of products corresponding to visual effects used to modify an appearance of one or more objects included in at least one of the user content 538 or the first modified user content 550. The product list 562 may also include additional information about one or more products corresponding to visual effects used to modify an appearance of one or more objects included in at least one of the user content 538 or the first modified user content 550, such as at least one of a respective description of the one or more products, a respective identifier of the one or more products, respective pricing information related to the one or more products, one or more respective ratings of the one or more products, one or more respective reviews of the one or more products, respective image content related to the one or more products, respective video content related to the one or more products, respective audio content related to the one or more products, or respective availability information related to the one or more products. In one or more examples, the third user interface 560 may include one or more options that are selectable to purchase one or more products included in the product list 562.

Figure 6:
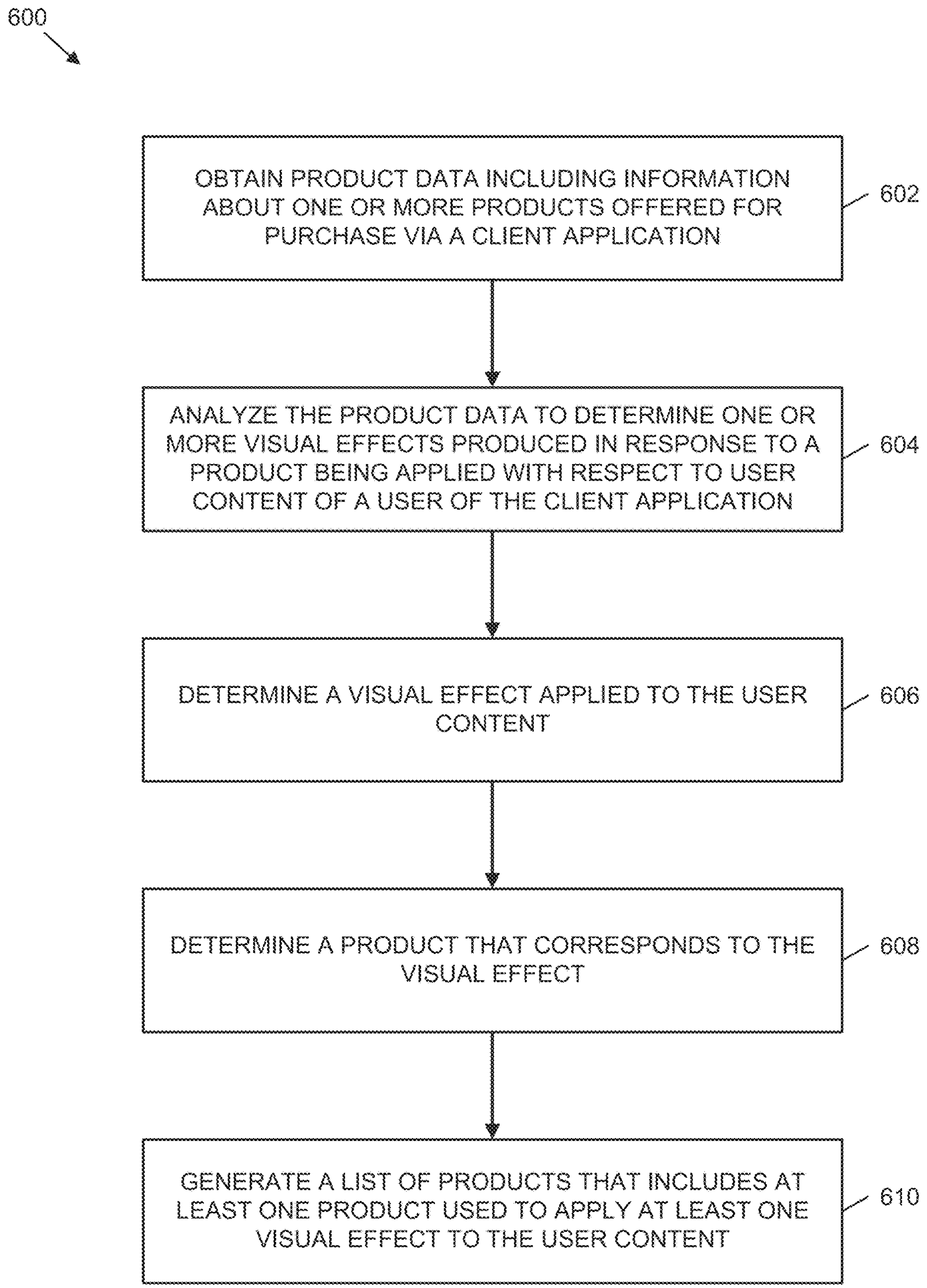
FIG. 6 is a flowchart illustrating example operations of a process to determine a list of products used to modify an appearance of an individual using augmented reality content, according to one or more example implementations.
Figure 7:
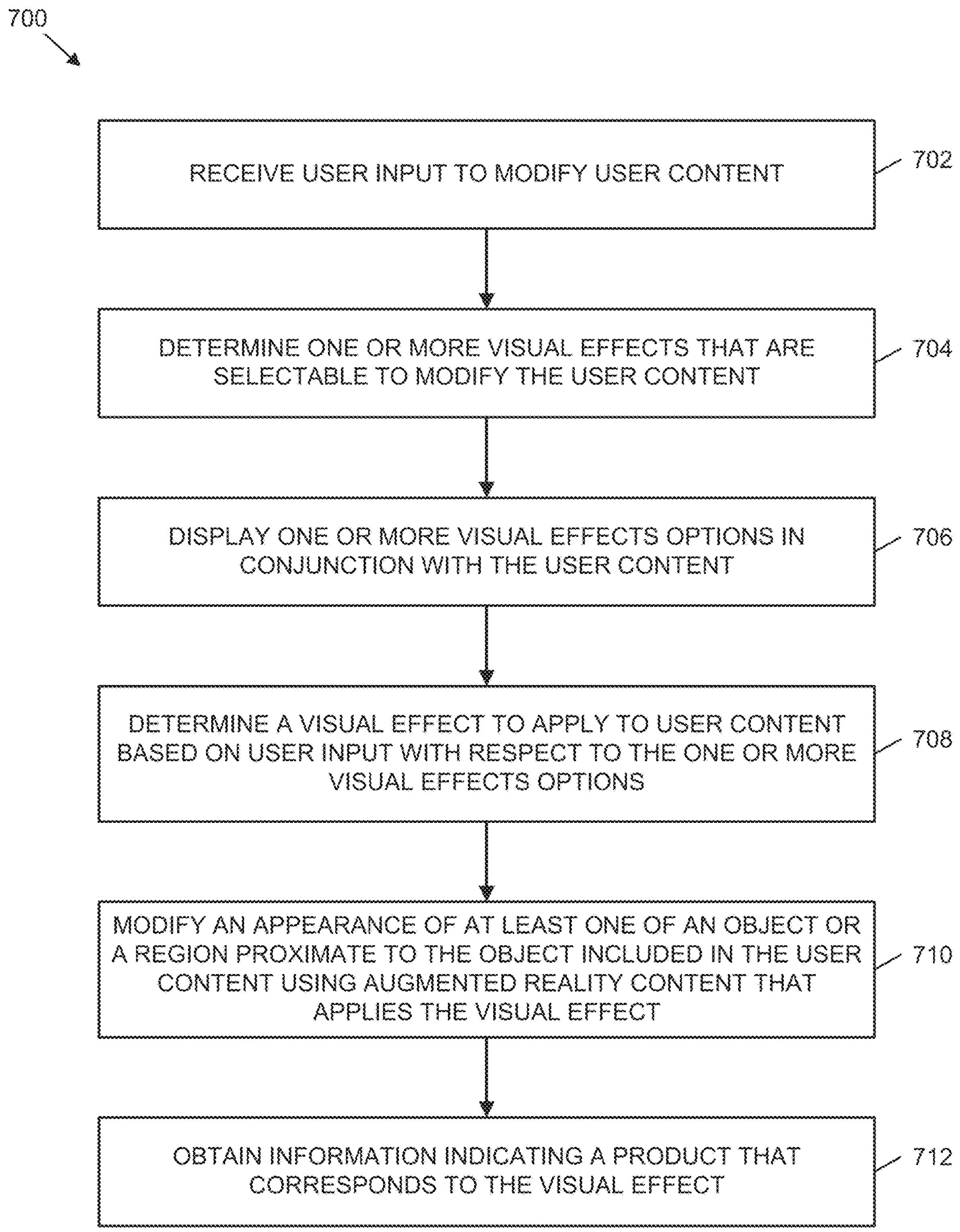
FIG. 7 is a flowchart illustrating example operations of a process to apply augmented reality content to modify an appearance of an individual, according to one or more example implementations.

FIGS. 6 and 7 illustrate flowcharts of processes to generate and apply augmented reality content items related to products offered for purchase via the client application 104. The processes may be embodied in computer-readable instructions for execution by one or more processors such that the operations of the processes may be performed in part or in whole by the functional components of at least one of the client application 104 or the server system 108. Accordingly, the processes described below are by way of example with reference thereto, in some situations. However, in other implementations, at least some of the operations of the processes described with respect to FIGS. 6 and 7 may be deployed on various other hardware configurations. The processes described with respect to FIGS. 6 and 7 are therefore not intended to be limited to the server system 108 or client device 102 and can be implemented in whole, or in part, by one or more additional components. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 6 is a flowchart illustrating example operations of a process 600 to determine a list of products used to modify an appearance of an individual using augmented reality content, according to one or more example implementations. The process 600 may include, at operation 602, obtaining product data including information about one or more products offered for purchase via a client application. The product data may be obtained from at least one of one or more sellers of one or more products, one or more manufacturers of one or more products, or one or more aggregators of product data. The product data may include at least one of text content, video content, audio content, or image content related to one or more products offered for purchase via the client application. In one or more examples, the product data may include pricing information, product descriptions, ratings, reviews, availability information, one or more combinations thereof, and the like of one or more products offered for purchase via the client application.

In addition, the process 600 may include, at operation 604, analyzing the product data to determine one or more visual effects produced in response to a product being applied with respect to user content of a user of the client application. The user content may include real-time content captured in a field of view of at least one camera of a client device. The user content may also include content previously captured by at least one camera of a client device and stored in at least one of memory of the client device or a remote storage location that is accessible to the client device.

In one or more examples, the product data may be analyzed using at least one of one or more object recognition techniques, one or more feature recognition techniques, one or more image feature extraction computational techniques, or one or more image feature classification computational techniques to determine one or more visual effects produced by one or more products offered for purchase via the client application. To illustrate, at least one of image content or video content may be analyzed to determine one or more visual effects produced when one or more products are applied. In one or more additional examples, metadata may be analyzed to determine one or more visual effects produced by applying at least one product to user content. In various examples, the product data may include metadata that includes color information, texture information, shading information, brightness information, thickness information, one or more combinations thereof and the like, indicating one or more visual effects produced in response to one or more products being applied to at least a portion of user content. In one or more illustrative examples, the one or more products may include beauty products. In these scenarios, the one or more visual effects may correspond to changes to the appearance of one or more facial features of individuals in response to applying at least one beauty product to at least one facial feature of an individual.

At operation 606, the process 600 may include determining a visual effect applied to the user content. In various examples, the visual effect to be applied to the user content may be determined based on selection of a user interface element that corresponds to the visual effect. An object included in the user content may be associated with respective products offered for purchase via the client application. For example, earrings may be associated with ear lobes, shoes may be associated with feet, and eye liner may be associated with eye lashes. The object related to the visual effect may be identified and the visual effect may be applied to the object to produce a modified version of the user content. In one or more implementations, the visual effect may be applied by implementing augmented reality content, such as an overlay or filter, that modifies pixel data in accordance with the visual effect. Different visual effects may be associated with different augmented reality content items.

Further, at operation 608, the process 600 may include determining a product that corresponds to the visual effect. In one or more examples, a database may store product data that includes a number of products and characteristics of individual products. The characteristics of the number of products may include visual effects that are used to modify the appearance of at least one of an object or a region proximate to the object in response to the product being applied with respect to the object. In these situations, the process 600 may include identifying a product that corresponds to the selected visual effect in the database. In one or more examples, the client application may send information to a server system indicating that the visual effect has been selected to modify an appearance of an object included in the user content. The server system may then query the database to determine the product that corresponds to the visual effect.

The process 600 may also include, at operation 610, generating a list of products that includes at least one product used to apply at least one visual effect to the user content. In one or more examples, the list of products may include identifiers of products that have been applied to modify the appearance of one or more portions of the user content. The list of products may also include additional information about the products, such as at least one of pricing information, seller information, manufacturer information, ratings information, reviews information, image content related to the products, video content related to the products, audio content related to the products, or availability information related to the products. In various examples, the product list may be included in a user interface displayed by a client device executing an instance of the client application, The user interface may also include at least one user interface element that is selectable to purchase at least one product included in the product list.

FIG. 7 is a flowchart illustrating example operations of a process 700 to apply augmented reality content to modify an appearance of an individual, according to one or more example implementations. The process 700 may include, at operation 702, receiving user input to modify user content. In one or more examples, a user interface may be displayed that includes the user content. The user interface may be displayed in conjunction with a client application. The client application may include at least one of messaging functionality or social networking functionality. Additionally, the client application may be used to purchase one or more products.

The user content may include at least one of image content or video content that is captured in a field of view of at least one camera of a client device. The user content may include real-time content captured in the field of view of at least one camera of the client device, The user content may also include content previously captured via at least one camera of a client device. The user interface may also include one or more user interface elements that are selectable to launch one or more tools to modify the user content, In one or more examples, the one or more user interface elements may include a user interface element that is selectable to apply one or more visual effects to one or more objects included in the user content. The one or more visual effects may be produced by applying a product to the one or more objects included in the user content.

At operation 704, the process 700 may include determining one or more visual effects that are selectable to modify the user content. The one or more visual effects may alter an appearance of one or more objects included in the user content. The one or more visual effects may be related to a product or a classification of products that may be applied to one or more objects included in the user content. In various examples, user input may be obtained that indicates a product classification or one or more products that a user has selected to apply to one or more objects included in the user content. Based on the selection of the product classification or the one or more products, the one or more visual effects associated with the product classification or one or more visual effects associated with the one or more products may be determined. To illustrate, associations between products or product classifications and their corresponding visual effects may be stored in a data store that is accessible to the client device.

In addition, at operation 706, the process 700 may include displaying one or more visual effects options in conjunction with the user content. For example, after selection of a user interface element that is selectable to modify the user content, an additional user interface may be displayed that includes the user content and one or more visual effects options that are selectable to modify the user content. In one or more examples, individual visual effects associated with a product or product classification may corresponding to respective user interface elements that are selectable to apply one or more visual effects to at least one object included in the user content. In one or more illustrative examples, the visual effects options may correspond to one or more colors or one or more shades of eye shadow. In these scenarios, the additional user interface may include an individual user interface element that is selectable to apply a respective color or shade of the eye shadow to a region proximate to the eye of an individual included in the user content. In various examples, each color or shade of eye shadow may correspond to at least one product that may be purchased via the client application. In one or more illustrative examples, the one or more visual effects options may include a range of colors, shades, textures, and the like. In these situations, the visual effects options may be displayed by at least one user interface element that may include a slider user interface element.

Further, the process 700 may include, at operation 708, determining a visual effect to apply to user content based on user input with respect to one or more visual effects options. The user input may include selection of a user interface element that corresponds to the visual effect. At operation 710, the process 700 may include modifying an appearance of at least one of an object or a region proximate to the object included in the user interface using augmented reality content that applies the visual effect. For example, individual visual effects options may be selectable to apply respective augmented reality content to apply the visual effect to at least one of an object or a region proximate to the object. In one or more illustrative examples, the augmented reality content may include at least one of an overlay or a filter that may be applied to the user content. In one or more examples, at least one of the client application or a server system may determine an object that corresponds to a selected visual effects option. The at least one of the client application or the server system may then analyze the user content to identify the object within the user content. The augmented reality content may then be implemented to modify the object, a region proximate to the object, or both based on the selected visual effects option. In various examples, the user interface may include a magnified version of an object to which one or more visual effects may be applied, such as 1.25 times, 1.50 times, 1.75 times, 2 times, 2.5 times, 3 times, 4 times, or 5 times an initial magnification of the one or more objects.

The process 700 may also include, at operation 712, obtaining information indicating a product that corresponds to the visual effect. The visual effect may be a simulation of a product being applied to at least one of an object or a region proximate to an object. Based on the visual effect option selected, a product that corresponds to the visual effects option may be determined by querying a data store that stores information indicating one or more products that are associated with a visual effect. In one or more examples, information related to the product may be displayed in a user interface that is produced by the client application. In various examples, the user interface may include a list of one or more products that correspond to one or more visual effects applied to the user content. The user interface may include information about the product, such as an identifier of the product, a description of the product, pricing information of the product, ratings of the product, availability of the product, one or more combinations thereof, and the like. In one or more implementations, the user interface may also include a user interface element that is selectable to initiate a financial transaction to purchase the product.

Figure 8:
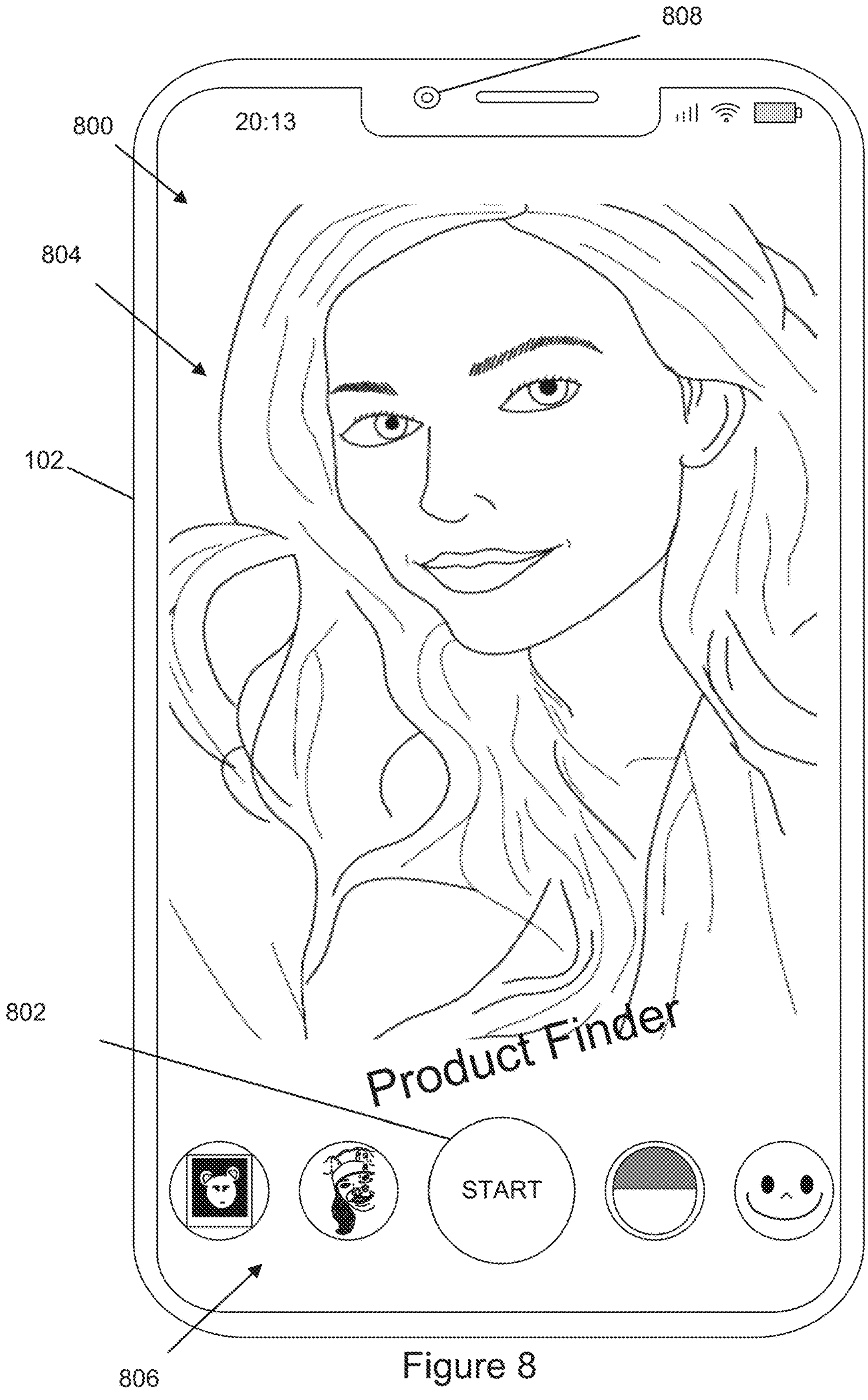
FIG. 8 is an illustration of a user interface that includes a user interface element that is selectable to initiate a process to provide visual effects options to modify an appearance of an object included in user content, according to one or more example implementations.

FIG. 8 is an illustration of a user interface 800 that includes a user interface element 802 that is selectable to initiate a process to provide visual effects options to modify an appearance of one or more objects included in user content 804, according to one or more example implementations. The user interface element 802 may be one of a number of user interface elements 806 that are each selectable to launch different types of functionality with respect to the user content 804. In various examples, at least a portion of the number of user interface elements may be selectable to implement augmented reality content with respect to the user content 804. The user interface 800 may be displayed via a display device of the client device 102. In addition, the user interface 800 may be displayed by a client application, such as the client application 104, that includes at least one of messaging functionality or social networking functionality. In one or more examples, the user content 804 may include content that is captured within a field of view of at least one camera 808 of the client device 102.

Figure 9:
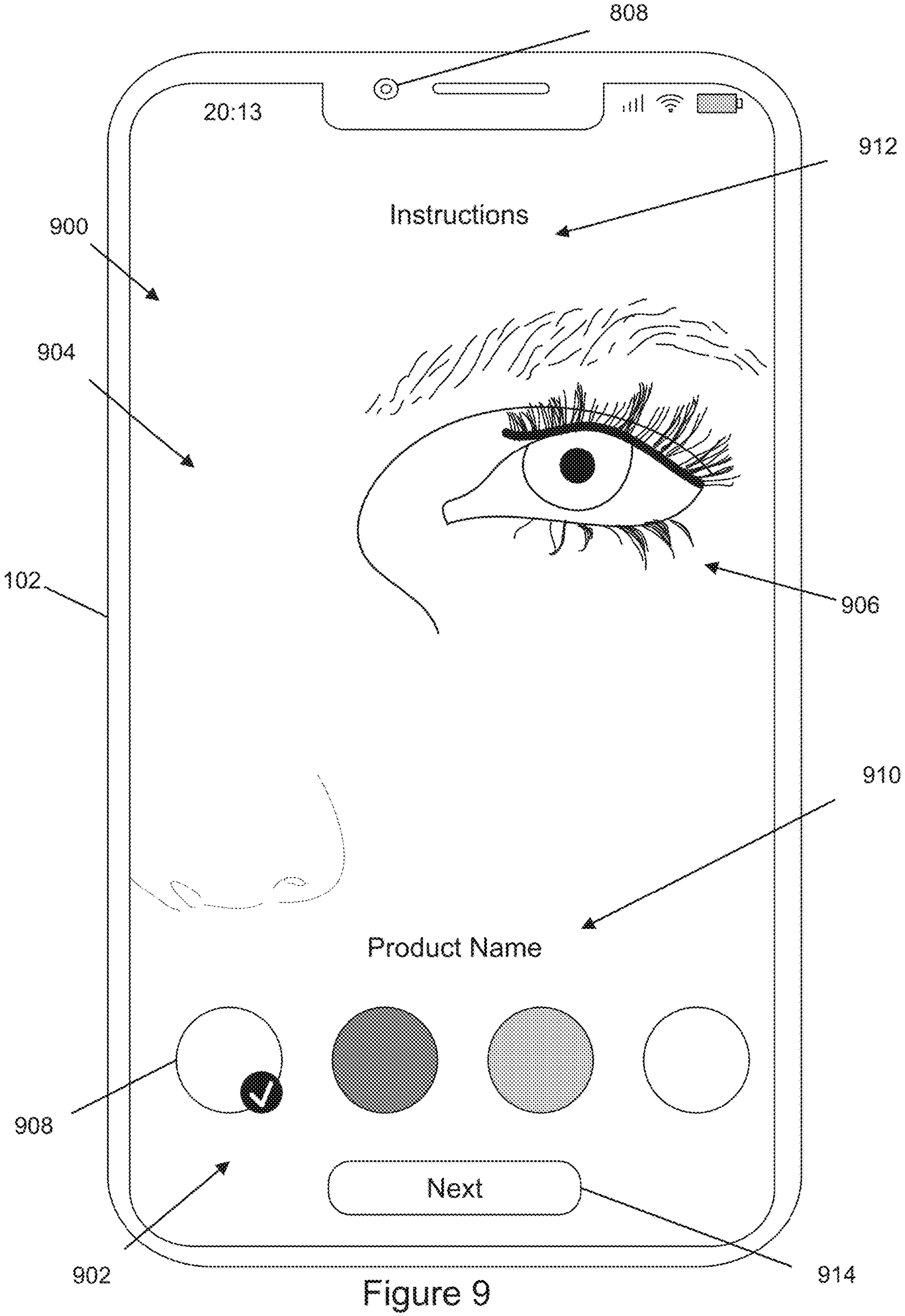
FIG. 9 is an illustration of a user interface that includes a first number of visual effects options corresponding to a first classification of products that may be applied to modify an appearance of an individual, according to one or more example implementations.

FIG. 9 is an illustration of a user interface 900 that includes a first number of visual effects options 902 corresponding to a first classification of products that may be applied to modify an appearance of an individual, according to one or more example implementations. The user interface 900 may be displayed via a display device of the client device 102. In addition, the user interface 900 may be displayed by a client application, such as the client application 104, that includes at least one of messaging functionality or social networking functionality. In one or more examples, the user interface 900 may be displayed in response to selection of the user interface element 802 of FIG. 8.

The user interface 900 may include a first magnified view 904 of the user content 804 of FIG. 8. The first magnified view 904 may correspond to a portion of the user content 804, such as a magnified view of one or more objects included in the user content 804. For example, the visual effects options 902 may be associated with a facial feature, and the first magnified view 904 may include at least a portion of the facial feature that is magnified with respect to the view of the facial feature included in the user interface 800. In the illustrative example of FIG. 9, an eye of an individual is magnified within the first magnified view 904 in relation to the view of the eye of the individual included in the user interface 800.

The number of visual effects options 902 may each correspond to a visual effect that modifies an appearance of one or more objects included in the first magnified view 904. The number of visual effects options 902 may correspond to one or more products included in a classification of products. In the illustrative example of FIG. 9, the one or more visual effects options 902 may correspond to at least one of colors or shades of eye shadow that may be applied to a region 906 that is proximate to an eye of an individual shown in the first magnified view 904. In various examples, the types of eye shadow related to each one of the visual effects options 902 may be associated with a product made by a different manufacturer or sold by a different seller. Augmented reality content, such as a filter or overlay, may be implemented to apply one or more selected visual effects options 902 to the region 906. In the illustrative example of FIG. 9, a first visual effects option 908 is shown as being selected. In these scenarios, an appearance of the region 906 may be modified according to at least one of a color, tone, texture, or other visual characteristic of the first visual effects option 908.

The user interface 900 may include additional information about the first visual effects option 908. For example, the user interface 900 may include an identifier 910 of a product that may be applied to produce the visual effects corresponding to the first visual effects option 908. The user interface 900 may also include instructions 912 related to applying at least one of the visual effects options to an object included in the first magnified view 904. The user interface 900 may also include information not shown in the user interface 900, such as an identifier of a classification related to the number of visual effects options 902 or an identifier of a color or shade related to a selected one of the visual effects options 902. Further, the user interface 900 may include a user interface element 914 that is selectable to display an additional user interface to apply a different number of visual effects to the user content 804 or to display a version of the user content 804 to which one or more visual effects have been applied.

Figure 10:
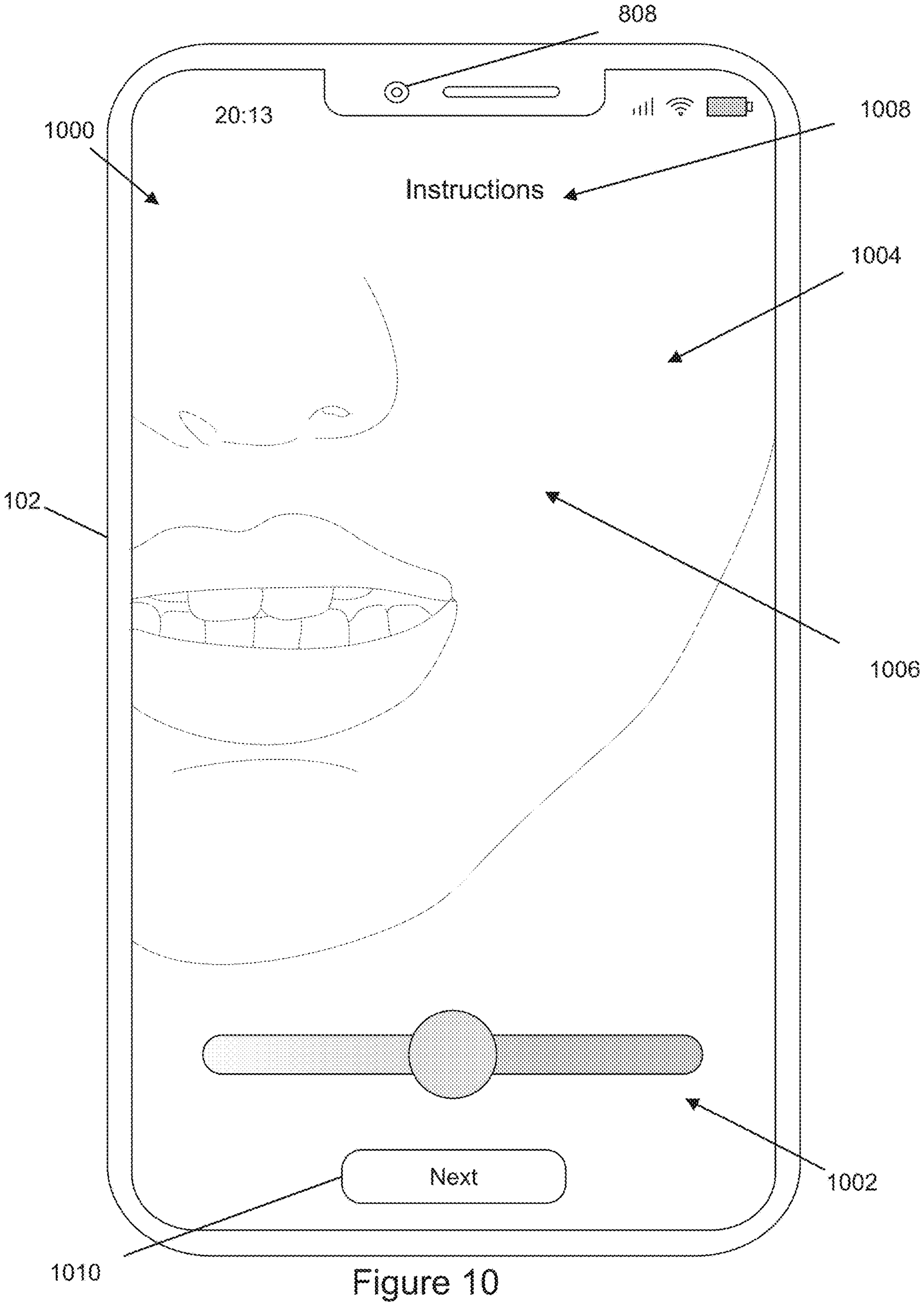
FIG. 10 is an illustration of a user interface that includes a second number of visual effects options corresponding to a second classification of products that may be applied to modify an appearance of an individual, according to one or more example implementations.

FIG. 10 is an illustration of a user interface 1000 that includes a second number of visual effects options 1002 corresponding to a second classification of products that may be applied to modify an appearance of an individual, according to one or more example implementations. The user interface 1000 may be displayed via a display device of the client device 102. In addition, the user interface 1000 may be displayed by a client application, such as the client application 104, that includes at least one of messaging functionality or social networking functionality. In one or more examples, the user interface 1000 may be displayed in response to selection of the user interface element 914 of FIG. 9.

The user interface 1000 may include a second magnified view 1004 of the user content 804 of FIG. 8. The second magnified view 1004 may correspond to a portion of the user content 804, such as a magnified view of one or more objects included in the user content 804. For example, the visual effects options 1002 may be associated with a facial feature, and the second magnified view 1004 may include at least a portion of the facial feature that is magnified with respect to the view of the facial feature included in the user interface 800. In the illustrative example of FIG. 10, a cheek of an individual is magnified within the second magnified view 1004 in relation to the view of the cheek of the individual included in the user interface 800.

The number of visual effects options 1002 may each correspond to a visual effect that modifies an appearance of one or more objects included in the second magnified view 1004. The number of visual effects options 1002 may correspond to one or more products included in a classification of products. In the illustrative example of FIG. 10, the one or more visual effects options 1002 may be displayed in a slider user interface element and correspond to at least one of colors, thicknesses, or shades of makeup foundation that may be applied to a region 1006 of a face of an individual shown in the second magnified view 1004. In various examples, the types of makeup foundation related to each one of the visual effects options 1002 may be associated with a product made by a different manufacturer or sold by a different seller. Augmented reality content, such as a filter or overlay, may be executed to apply one or more selected visual effects options 1002 to the region 1006. In these scenarios, an appearance of the region 1006 may be modified according to at least one of a color, tone, texture, or other visual characteristic of a selected one of the visual effects options 1002.

The user interface 1000 may include additional information about the visual effects options 1002. For example, the user interface 1000 may include instructions 1008 related to applying at least one of the visual effects options 1002 to an object included in the second magnified view 1004. Although not shown in the illustrative example of FIG. 10, the user interface 1000 may also include additional information related to the visual effects options 1002, such as one or more identifiers of products related to the visual effects options 1002, an identifier of a classification related to the number of visual effects options 1002, or an identifier of a color or shade related to a selected one of the visual effects options 1002. Further, the user interface 1000 may include a user interface element 1010 that is selectable to display an additional user interface to apply a different number of visual effects to the user content 804 or to display a version of the user content 804 to which one or more visual effects have been applied.

Figure 11:
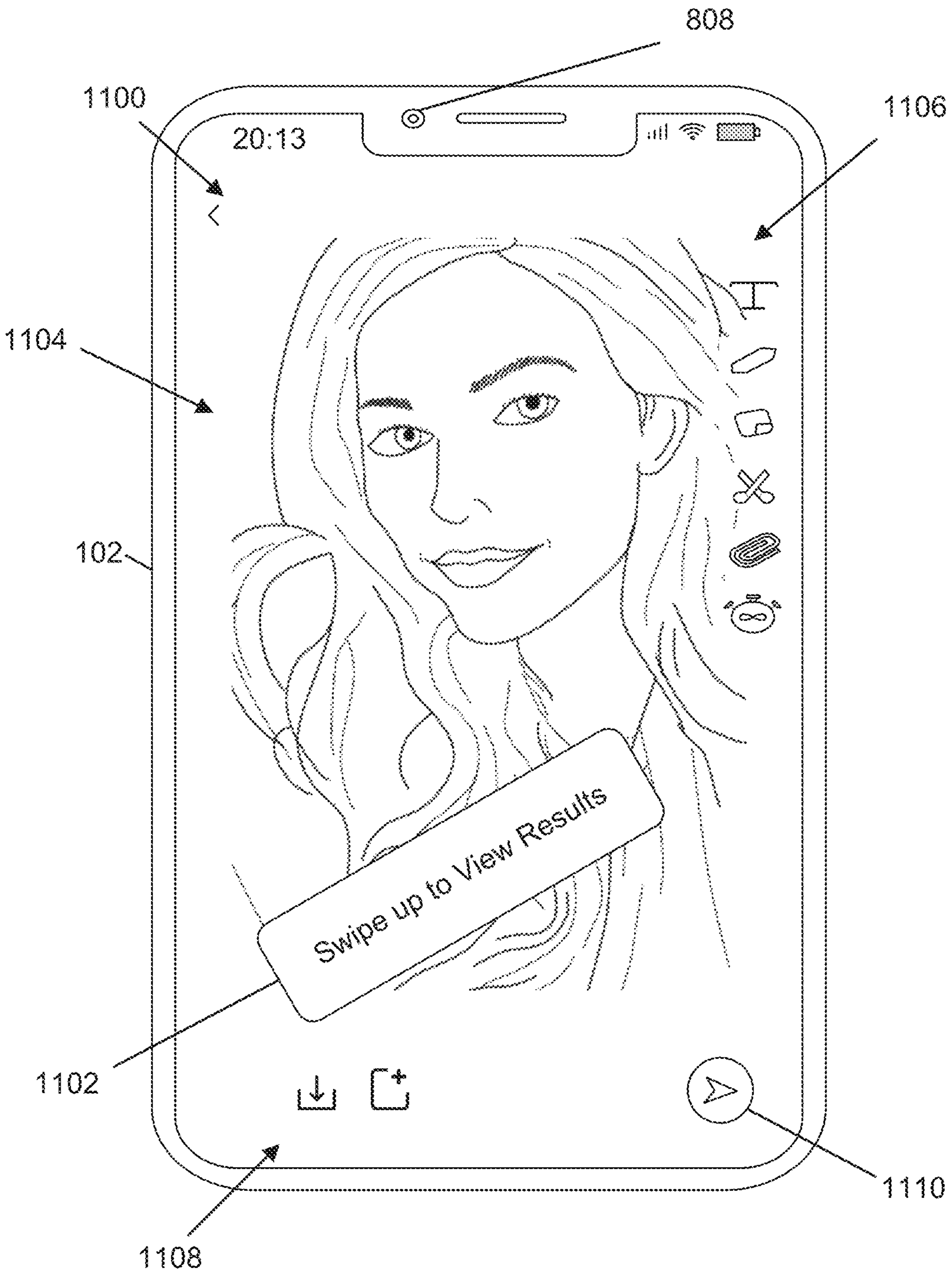
FIG. 11 is an illustration of a user interface that includes a user interface element that is selectable to view a list of products used to modify an appearance of an individual, according to one or more example implementations.

FIG. 11 is an illustration of a user interface 1100 that includes a user interface element 1102 that is selectable to view a list of products used to modify an appearance of an individual, according to one or more example implementations. The user interface 1100 may be displayed via a display device of the client device 102 and produced by a client application executed by the client device 102, such as the client application 104. In various examples, the user interface 1100 may include modified user content 1104 that is a modified version of the user content 804 of FIG. 8. In various examples, the modified user content 1104 may comprise a version of the user content 804 that was modified by one or more visual effects, such as one or more visual effects added via the user interface 900 or the user interface 1000.

The user interface 1100 may also include one or more first user interface elements 1106 that are individually selectable to further modify the modified user content 1104. To illustrate, the first user interface elements 1106 may include a user interface element that is selectable to add text content to the modified user content 1104, such as a caption. Additionally, the first user interface elements 1106 may include a user interface element that is selectable to add an image overlay to the modified user content 1104, such as an image overlay related to a location of a user of the client application or a topic related to the modified user content 1104. In various examples, the one or more first user interface elements 1106 may be selectable to apply a filter to the modified user content 1104. At least one of the one or more first user interface elements 1106 may be selectable to launch one or more creative tools that may be used to modify the modified user content 1104. The one or more creative tools may include at least one of one or more drawing tools or one or more painting tools.

The user interface 1100 may also include one or more second user interface elements 1108. At least one of the second user interface elements 1108 may be selectable to save the modified user content 1104 to memory of the client device 102. In addition, at least one of the second user interface elements 1108 may be selectable to save the modified user content 1104 to a collection of content items related to a user of the client device 102, Further, the user interface 1100 may include a third user interface element 1110 that is selectable to share the modified user content 1104, In one or more examples, selection of the third user interface element 1110 may generate an additional user interface that includes at least one of one or more recipients or one or more destinations for the modified user content 1104. In various examples, the third user interface element 1110 may be selectable to generate a message to share the modified user content 1104. In one or more additional examples, the third user interface element 1110 may be selectable to share the modified user content 1104 via a post to a social network of the user of the client application 104.

Figure 12:
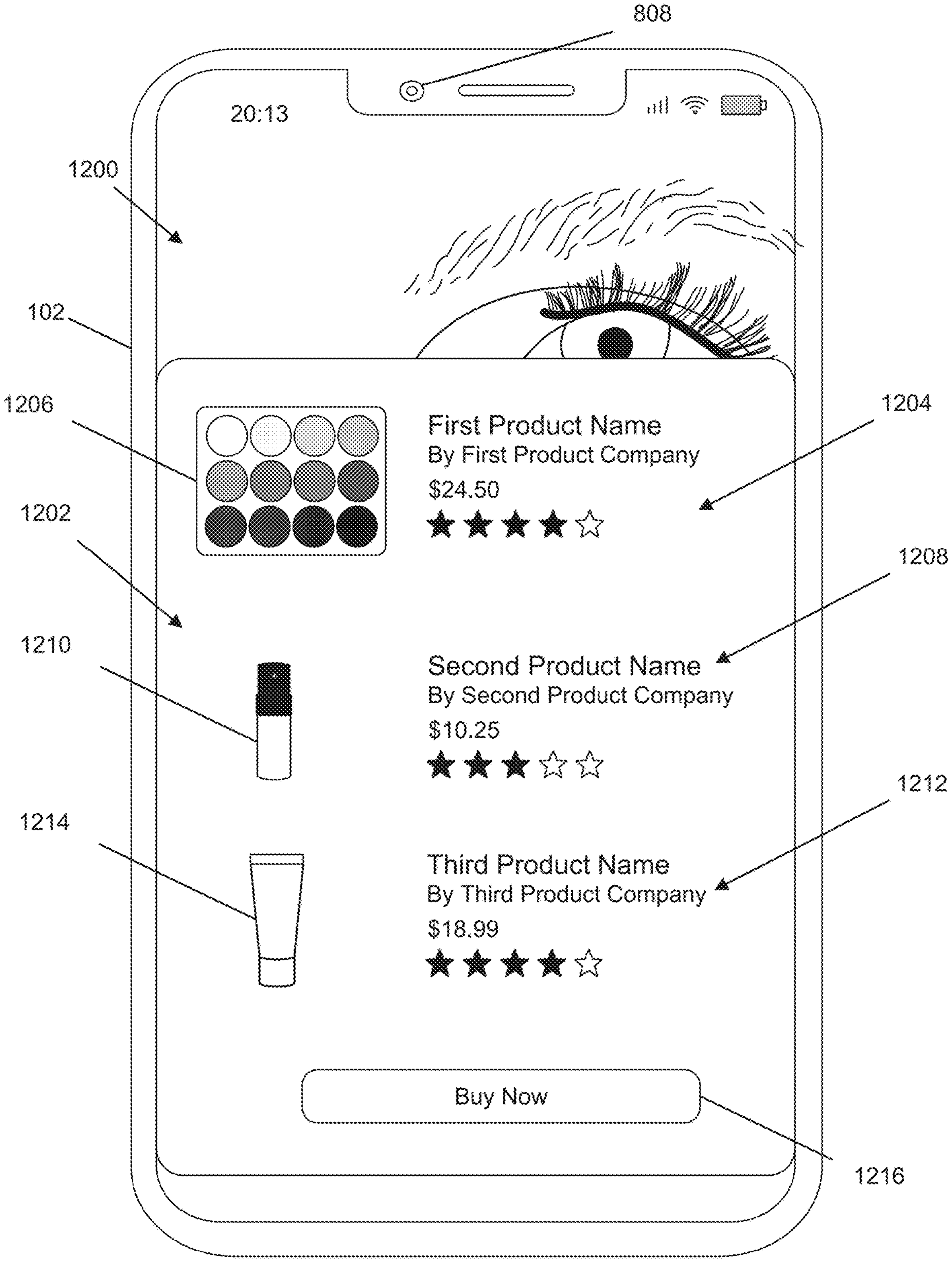
FIG. 12 is an illustration of a user interface that includes a list of products used to modify an appearance of an individual, according to one or more example implementations.

FIG. 12 is an illustration of a user interface 1200 that includes a list of products 1202 used to modify an appearance of an individual, according to one or more example implementations. The user interface 1200 may be displayed via a display device of the client device 102 and produced by a client application executed by the client device 102, such as the client application 104. In one or more examples, the user interface 1200 may be produced in response to selection of the user interface element 1102 of FIG. 11. In various examples, the products included in the list of products 1202 may correspond to one or more visual effects applied to the user content 804 and used to produce a modified version of the user content 804.

In the illustrative example of FIG. 12, the list of products 1202 may include information about one or more products, such as first information 1204 about a first product 1206, second information 1208 about a second product 1210, and third information 1212 about a third product 1214. At least one of the first product 1206, the second product 1210, or the third product 1214 may be applied to modify an appearance of an individual included in user content. The first information 1204, the second information 1208, and the third information 1212 may include at least an identifier of a respective product, a seller of the respective product, pricing information of a respective product, and ratings information of the respective product. The user interface 1200 may also include a user interface element 1216 that is selectable to initiate a transaction to purchase one or more of the first product 1206, the second product 1210, or the third product 1214.

Figure 13:
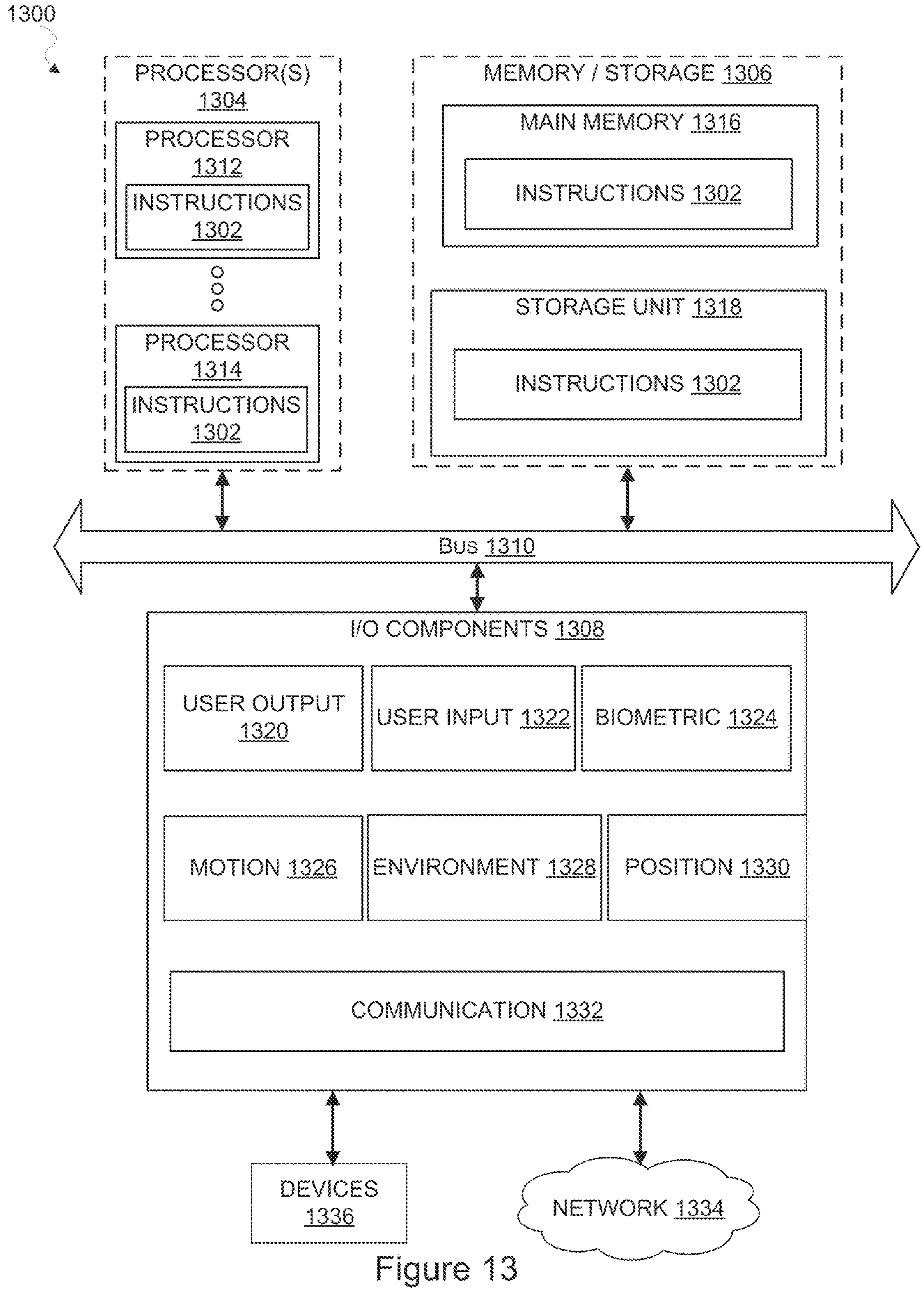
FIG. 13 is a block diagram illustrating components of a machine, in the form of a computer system, that may read and execute instructions from one or more machine-readable media to perform any one or more methodologies described herein, in accordance with one or more example implementations.

FIG. 13 is a block diagram illustrating components of a machine 1300, according to some example implementations, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1302 (e.g., software, a program, an application, an applet, an app, or other executable code) for causing the machine 1300 to perform any one or more of the methodologies discussed herein may be executed. As such, the instructions 1302 may be used to implement modules or components described herein. The instructions 1302 transform the general, non-programmed machine 1300 into a particular machine 1300 programmed to carry out the described and illustrated functions in the manner described. In alternative implementations, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1302, sequentially or otherwise, that specify actions to be taken by machine 1300. Further, while only a single machine 1300 is illustrated, the term "machine" shall also be taken to include a collection of machines that individually or jointly execute the instructions 1302 to perform any one or more of the methodologies discussed herein.

The machine 1300 may include processors 1304, memory/storage 1306, and I/O components 1308, which may be configured to communicate with each other such as via a bus 1310. In an example implementation, the processors 1304 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1312 and a processor 1314 that may execute the instructions 1302. The term "processor" is intended to include multi-core processors 1304 that may comprise two or more independent processors (sometimes referred to as "cores") that may execute instructions 1302 contemporaneously. Although FIG. 10 shows multiple processors 1304, the machine 1300 may include a single processor 1312 with a single core, a single processor 1312 with multiple cores (e.g., a multi-core processor), multiple processors 1312, 1314 with a single core, multiple processors 1312, 1314 with multiple cores, or any combination thereof.

The memory/storages 1306 may include memory, such as a main memory 1316, or other memory storage, and a storage unit 1318, both accessible to the processors 1304 such as via the bus 1310. The storage unit 1318 and main memory 1316 store the instructions 1302 embodying any one or more of the methodologies or functions described herein. The instructions 1302 may also reside, completely or partially, within the main memory 1316, within the storage unit 1318, within at least one of the processors 1304 (e.g., within the processor's cache memory), or any suitable combination thereof, during execution thereof by the machine 1300. Accordingly, the main memory 1316, the storage unit 1318, and the memory of processors 1304 are examples of machine-readable media.

The I/O components 1308 may include a wide variety of components to receive input, provide output, produce output, transmit information, exchange information, capture measurements, and so on. The specific I/O components 1308 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1308 may include many other components that are not shown in FIG. 10. The I/O components 1308 are grouped according to functionality merely for simplifying the following discussion and the grouping is in no way limiting. In various example implementations, the 110 components 1308 may include user output components 132.0 and user input components 1322. The user output components 1320 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1322 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 1308 may include biometric components 1324, motion components 1326, environmental components 1328, or position components 1330 among a wide array of other components. For example, the biometric components 1324 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1326 may include acceleration sensor components (e.g., accelerometer), gravitation sensor components, rotation sensor components (e.g., gyroscope), and so forth. The environmental components 1328 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment, The position components 1330 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1308 may include communication components 1332 operable to couple the machine 1300 to a network 1334 or devices 1336. For example, the communication components 1332 may include a network interface component or other suitable device to interface with the network 1334. In further examples, communication components 1332 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1336 may be another machine 1300 or any of a wide variety of peripheral devices (e.g., a peripheral device coupled via a USB).

Moreover, the communication components 1332 may detect identifiers or include components operable to detect identifiers. For example, the communication components 1332 may include radio frequency identification (RBI)) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 1332, such as location via Internet Protocol (IP) geo-location, location via Wi-Fi® signal triangulation, location via detecting an NEC beacon signal that may indicate a particular location, and so forth.

Figure 14:
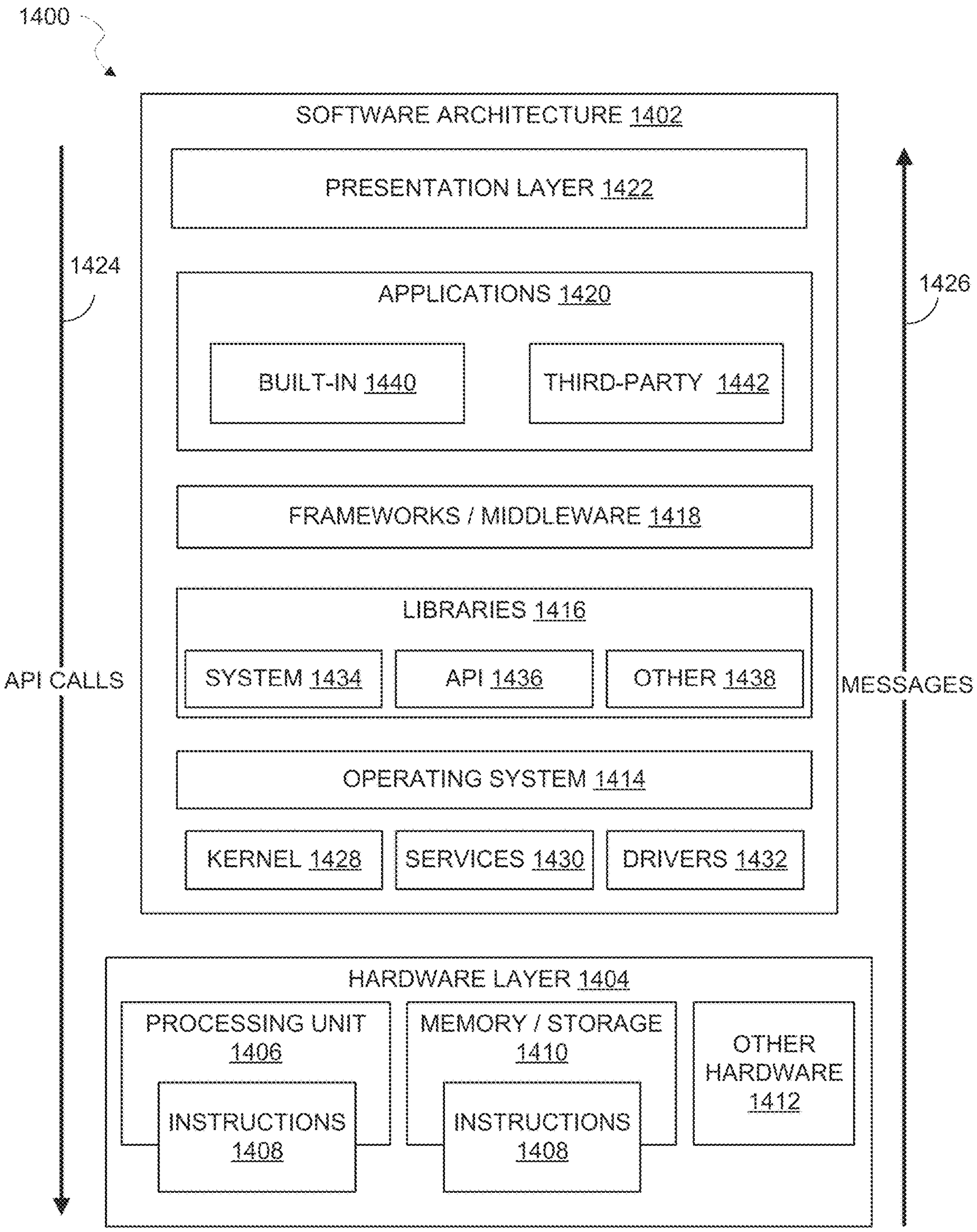
FIG. 14 is block diagram illustrating a representative software architecture that may be used in conjunction with one or more hardware architectures described herein, in accordance with one or more example implementations.

FIG. 14 is a block diagram illustrating system 1400 that includes an example software architecture 1402, which may be used in conjunction with various hardware architectures herein described. FIG. 14 is a non-limiting example of a software architecture and it will be appreciated that many other architectures may be implemented to facilitate the functionality described herein. The software architecture 1402 may execute on hardware such as machine 1300 of FIG. 10 that includes, among other things, processors 1304, memory/storage 1306, and input/output (I/O) components 1308. A representative hardware layer 1404 is illustrated and can represent, for example, the machine 1300 of FIG. 13. The representative hardware layer 1404 includes a processing unit 1406 having associated executable instructions 1408. Executable instructions 1408 represent the executable instructions of the software architecture 1402, including implementation of the methods, components, and so forth described herein. The hardware layer 1404 also includes at least one of memory or storage modules memory/storage 1410, which also have executable instructions 1408. The hardware layer 1404 may also comprise other hardware 1512.

In the example architecture of FIG. 14, the software architecture 1402 may be conceptualized as a stack of layers where each layer provides particular functionality. For example, the software architecture 1402 may include layers such as an operating system 1414, libraries 1416, frameworks/middleware 1418, applications 1420, and a presentation layer 1422. Operationally, the applications 1420 or other components within the layers may invoke API calls 1424 through the software stack and receive messages 1426 in response to the API calls 1424. The layers illustrated are representative in nature and not all software architectures have all layers. For example, some mobile or special purpose operating systems may not provide a frameworks/middleware 1418, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. The drivers 1432 are responsible for controlling or interfacing with the underlying hardware. For instance, the drivers 1432 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1416 provide a common infrastructure that is used by at least one of the applications 1420, other components, or layers. The libraries 1416 provide functionality that allows other software components to perform tasks in an easier fashion than to interface directly with the underlying operating system 1414 functionality (e.g., kernel 1428, services 1430, drivers 1432). The libraries 1416 may include system libraries 1434 (e.g., C standard library) that may provide functions such as memory allocation functions, string manipulation functions, mathematical functions, and the like. In addition, the libraries 1416 may include API libraries 1436 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks/middleware 1418 (also sometimes referred to as middleware) provide a higher-level common infrastructure that may be used by the applications 1420 or other software components/modules. For example, the frameworks/middleware 1418 may provide various graphical user interface functions, high-level resource management, high-level location services, and so forth. The frameworks/middleware 1418 may provide a broad spectrum of other APIs that may be utilized by the applications 1420 or other software components/modules, some of which may be specific to a particular operating system 1414 or platform.

The applications 1420 include built-in applications 1440 and third-party applications 1442. Examples of representative built-in applications 1440 may include, but are not limited to, a contacts application, a browser application, a book reader application, a location application, a media application, a messaging application, or a game application. Third-party applications 1442 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1442 may invoke the API calls 1424 provided by the mobile operating system (such as operating system 1414) to facilitate functionality described herein.

The applications 1420 may use built-in operating system functions (e.g., kernel 1428, services 1430, drivers 1432), libraries 1416, and frameworks/middleware 1418 to create UIs to interact with users of the system. Alternatively, or additionally, in some systems, interactions with a user may occur through a presentation layer, such as presentation layer 1422. In these systems, the application/component "logic" can be separated from the aspects of the application/component that interact with a user.

GLOSSARY

"CARRIER SIGNAL," in this context, refers to any intangible medium that is capable of storing, encoding, or carrying transitory or non-transitory instructions 1302 for execution by the machine 1300, and includes digital or analog communications signals or other intangible medium to facilitate communication of such instructions 1302. Instructions 1302 may be transmitted or received over the network 110, 1334 using a transitory or non-transitory transmission medium via a network interface device and using any one of a number of well-known transfer protocols.

"CLIENT DEVICE," in this contest, refers to any machine 1300 that interfaces to a communications network 110, 1334 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 110, 1334.

"COMMUNICATIONS NETWORK," in this context, refers to one or more portions of a network 110, 1334 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched. Telephone Network (PSTN), a plain old telephone service (POTS) network, a cellular telephone network, a wireless network, a Wi-Fi® network, another type of network, or a combination of two or more such networks. For example, a network 110, 1334 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVIDO) technology, General Packet Radio Service (CPRS) technology, Enhanced. Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message that is accessible for a time-limited duration. An ephemeral message may be a text, an image, a video, and the like. The access time for the ephemeral message may be set by the message sender. Alternatively, the access time may be a default setting, or a setting specified by the recipient. Regardless of the setting technique, the message is transitory.

"MACHINE-READABLE MEDIUM," in this context, refers to a component, device, or other tangible media able to store instructions 1302 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" may be taken to include a single medium or multiple media (e.g., a centralized or distributed database, or associated caches and servers) able to store instructions 1302. The term "machine-readable medium" shall also be taken to include any medium, or combination of multiple media, that is capable of storing instructions 1302 (e.g., code) for execution by a machine 1300, such that the instructions 1302, when executed by one or more processors 1304 of the machine 1300, cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 1304 or other programmable processor. Once configured by such software, hardware components become specific machines (or specific components of a machine 1300) uniquely tailored to perform the configured functions and are no longer general-purpose processors 1304. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 1304 configured by software to become a special-purpose processor, the general-purpose processor 1304 may be configured as respectively different special-purpose processors (e.g., comprising different hardware components) at different times. Software accordingly configures a particular processor 1312, 1314 or processors 1304, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 1304 that are temporarily configured (e.g., by software) or permanently configured to perform the relevant operations. Whether temporarily or permanently configured, such processors 1304 may constitute processor-implemented components that operate to perform one or more operations or functions described herein. As used herein, "processor-implemented component" refers to a hardware component implemented using one or more processors 1304. Similarly, the methods described herein may be at least partially processor-implemented, with a particular processor 1312, 1314 or processors 1304 being an example of hardware. For example, at least some of the operations of a method may be performed by one or more processors 1304 or processor-implemented components. Moreover, the one or more processors 1304 may also operate to support performance of the relevant operations in a "cloud computing" environment or as a "software as a service" (SaaS). For example, at least some of the operations may be performed by a group of computers (as examples of machines 1300 including processors 1304), with these operations being accessible via a network 110 (e.g., the Internet) and via one or more appropriate interfaces (e.g., an API). The performance of certain of the operations may be distributed among the processors, not only residing within a single machine 1300, but deployed across a number of machines. In some example implementations, the processors 1304 or processor-implemented components may be located in a single geographic location (e.g., within a home environment, an office environment, or a server farm). In other example implementations, the processors 1304 or processor-implemented components may be distributed across a number of geographic locations.

"PROCESSOR," in this context, refers to any circuit or virtual circuit (a physical circuit emulated by logic executing on an actual processor 1304) that manipulates data values according to control signals (e.g., "commands," "op codes," "machine code," etc.) and which produces corresponding output signals that are applied to operate a machine 1300. A processor 1304 may, for example, be a CPU, a RISC processor, a CISC processor, a GPU, a DSP, an ASIC, a RFIC or any combination thereof. A processor 1304 may further be a multi-core processor having two or more independent processors 1304 (sometimes referred to as "cores") that may execute instructions 1302 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed implementations without departing from the scope of the present disclosure. These and other changes or modifications are intended to be included within the scope of the present disclosure, as expressed in the following claims.

What is claimed is:

1. A computer-implemented method comprising:

obtaining, by one or more computing devices, product data that includes information about one or more products offered for purchase via a client application;

analyzing, by at least one computing device of the one or more computing devices, the product data to determine one or more visual effects produced in response to at least one product of the one or more products being applied with respect to one or more users of the client application, wherein analyzing the product data comprises:

determining at least one object corresponding to the at least one product by implementing an object recognition technique; and identifying, by implementing at least one of an image feature extraction computational technique or an image feature classification computational technique, at least one corresponding visual effect being applied to the at least one object or a region proximate to the at least one object;

determining, by at least one computing device of the one or more computing devices, a visual effect of the one or more visual effects to be applied to user content based on user input indicating selection of a user interface element corresponding to the visual effect, the user content corresponding to a user of the client application;

determining, by at least one computing device of the one or more computing devices, a product that corresponds to the visual effect;

generating, by at least one computing device of the one or more computing devices, a list of products that includes the product, each product in the list of products corresponding to at least one visual effect enabled to modify the user content; and generating, by at least one computing device of the one or more computing devices, a modified version of the user content, the modified version of the user content including the visual effect being applied to the user content.

2. The method of claim 1, further comprising:

determining, by at least one computing device of the one or more computing devices, a plurality of classifications of products;

determining, by at least one computing device of the one or more computing devices, first visual effects of a first number of products included in a first classification of the plurality of classifications; and determining, by at least one computing device of the one or more computing devices, second visual effects of a second number of products included in a second classification of the plurality of classifications.

3. The method of claim 2, further comprising:

determining, by at least one computing device of the one or more computing devices, a first number of visual effects options corresponding to the first visual effects, the first visual effects modifying a first appearance related to a first object; and determining, by at least one computing device of the one or more computing devices, a second number of visual effects options corresponding to the second visual effects, the second visual effects modifying a second appearance related to a second object that is different from the first object.

4. The method of claim 3, wherein the first visual effects modify at least one of color, shade, or texture, of a first facial feature and the second visual effects modify at least one of color, shade, or texture of a second facial feature.

5. The method of claim 3, wherein:

the first visual effects include a first visual effect that corresponds to first augmented reality content that applies the first visual effect in relation to the first object included in the user content; and the second visual effects include a second visual effect that corresponds to second augmented reality content that applies the second visual effect in relation to the second object included in the user content.

6. The method of claim 5, further comprising obtaining, by at least one computing device of the one or more computing devices, modified user content that includes the first visual effect applied in relation to the first object and the second visual effect applied in relation to the second object.

7. The method of claim 5, wherein the first visual effect corresponds to a first product manufactured by a first manufacturer and the second visual effect corresponds to a second product manufactured by a second manufacturer, and the method further comprises receiving, by at least one computing device of the one or more computing devices and via the client application, a request to purchase at least one of the first product or the second product.

8. The method of claim 1, further comprising:

obtaining, by at least one computing device of the one or more computing devices, a message that includes the modified version of the user content; and sending, by at least one computing device of the one or more computing devices, the message to a client device of a recipient of the message, the message being accessible via an instance of the client application executed by the client device of the recipient.

9. A system comprising:

one or more hardware processors; and one or more non-transitory computer-readable storage media including computer-readable instructions that, when executed by the one or more hardware processors, cause the one or more hardware processors to perform operations comprising:

obtaining product data that includes information about one or more products offered for purchase via a client application;

analyzing the product data to determine one or more visual effects produced in response to at least one product of the one or more products being applied with respect to one or more users of the client application, wherein analyzing the product data comprises:

determining an object that corresponds to the at least one product by implementing one or more object recognition techniques, wherein at least one corresponding visual effect is applied to at least one of the object or a region proximate to the object; and identifying the at least one visual effect by implementing at least one of an image feature extraction computational technique or an image feature classification computational technique;

determining a visual effect of the one or more visual effects to be applied to user content based on user input indicating selection of a user interface element corresponding to the visual effect, the user content corresponding to a user of the client application;

determining a product that corresponds to the visual effect;

generating a list of products that includes the product, each product in the list of products corresponding to at least one visual effect enabled to modify the user content; and generating a message that includes a modified version of the user content, the modified version of the user content including the visual effect being applied to the user content.

10. The system of claim 9, wherein the one or more non-transitory computer-readable storage media include additional computer-readable instructions that, when executed by the one or more hardware processors, cause the one or more hardware processors to perform additional operations comprising:

determining that the visual effect corresponds to the product based on metadata related to the product data, the metadata being provided by a service provider that aggregates information corresponding to a number of products.

11. The system of claim 10, wherein:

the one or more non-transitory computer-readable storage media include additional computer-readable instructions that, when executed by the one or more hardware processors, cause the one or more hardware processors to perform additional operations comprising:

determining an object related to the product based on the metadata, wherein the visual effect is applied to at least one of the object or a region proximate to the object.

12. The system of claim 9, wherein the one or more non-transitory computer-readable storage media include additional computer-readable instructions that, when executed by the one or more hardware processors, cause the one or more hardware processors to perform additional operations comprising:

analyzing the user content using an object recognition technique to determine an additional object included in the user content;

determining a measure of similarity between the additional obj ect included in the user content and the object that corresponds to the product;

determining that the measure of similarity is at least a threshold measure of similarity; and implementing augmented reality content with respect to the additional object to apply the visual effect to at least one of the additional object or a region proximate to the additional object.

13. The system of claim 9, wherein the one or more non-transitory computer-readable storage media include additional computer-readable instructions that, when executed by the one or more hardware processors, cause the one or more hardware processors to perform additional operations comprising:

obtaining social networking content that includes a modified version of the user content, the modified version of the user content including the visual effect applied to the object within the user content; and making the social networking content accessible to one or more contacts of the user of the client application.

14. The system of claim 9, wherein:

the one or more non-transitory computer-readable storage media include additional computer-readable instructions that, when executed by the one or more hardware processors, cause the one or more hardware processors to perform additional operations comprising determining a classification of the product by analyzing one or more characteristics of the product in relation to one or more criteria of the classification, the classification being included in a plurality of classifications of products; and the visual effect is included in a plurality of visual effects corresponding to the classification.

15. A method comprising:

receiving, by one or more computing devices, user input to modify user content, the user content being captured within a field of view of a camera;

determining, by at least one computing device of the one or more computing devices, one or more visual effects options that are selectable to modify the user content, the one or more visual effects options being related to one or more products offered for purchase via a client application;

displaying, by at least one computing device of the one or more computing devices, a user interface of the client application that includes the one or more visual effects options and at least a portion of the user content;

determining, by at least one computing device of the one or more computing devices, a visual effect to apply to the user content based on user input selecting a visual effects option of the one or more visual effects options, wherein the visual effects option that is selected corresponds to the visual effect;

determining, by at least one computing device of the one or more computing devices, an object that corresponds to the visual effect;

analyzing, by at least one computing device of the one or more computing devices, the user content by implementing one or more object recognition techniques to identify the object in the at least a portion of the user content;

modifying, by at least one computing device of the one or more computing devices, an appearance of at least one of the object or a region proximate to the object included in the user content using augmented reality content that applies the visual effect; and obtaining, by at least one computing device of the one or more computing devices, information indicating a product that corresponds to the visual effect.

16. The method of claim 15, further comprising:

displaying, by at least one computing device of the one or more computing devices, a first user interface of the client application, the first user interface including additional user content and a first number of visual effects options corresponding to a first classification of products; and displaying, by at least one computing device of the one or more computing devices, a second user interface of the client application, the second user interface including the additional user content and a second number of visual effects options corresponding to a second classification of products.

17. The method of claim 16, further comprising:

modifying, by at least one computing device of the one or more computing devices, a first appearance of a first object included in the additional user content according to a first visual effect related to a first visual effects option included in the first number of visual effects options to produce a first modified version of the additional user content; and modifying, by at least one computing device of the one or more computing devices, a second appearance of a second object included in the additional user content according to a second visual effect related to a second visual effects option included in the second number of visual effects options to produce a second modified version of the additional user content.

18. The method of claim 17, wherein the first object includes a first facial feature of an individual included in the additional user content and the second object includes a second facial feature of the individual.

19. The method of claim 17, further comprising:

displaying, by at least one computing device of the one or more computing devices, a third user interface of the client application that includes a list of products, the list of products including first product information corresponding to a first product related to the first visual effect and second product information corresponding to a second product related to the second visual effect.

20. The method of claim 17, wherein:

the first user interface includes a magnified version of a first portion of the additional user content that includes the first object; and the second user interface includes a magnified version of a second portion of the additional user content that includes the second object.

* * * * *